US012776234B2

(12) United States Patent
Ference

(10) Patent No.: US 12,776,234 B2
(45) Date of Patent: Oct. 27, 2026

(54) ILLUMINATED FLAG

(71) Applicant: Thomas George Ference, Essex Junction, VT (US)

(72) Inventor: Thomas George Ference, Essex Junction, VT (US)

( * ) Notice: Subject to any disclaimer, the term of this patent is extended or adjusted under 35 U.S.C. 154(b) by 435 days.

(21) Appl. No.: 17/738,103

(22) Filed: May 6, 2022

(65) Prior Publication Data

US 2022/0358860 A1 Nov. 10, 2022

Related U.S. Application Data

(60) Provisional application No. 63/185,453, filed on May 7, 2021.

(51) Int. Cl.

*G09F 17/00* (2006.01)
*E04H 12/32* (2006.01)
*G09F 13/04* (2006.01)

(52) U.S. Cl.

CPC ............. *G09F 17/00* (2013.01); *E04H 12/32* (2013.01); *G09F 13/0431* (2021.05); *G09F 13/0448* (2021.05); *G09F 2017/005* (2013.01)

(58) Field of Classification Search

CPC .. G09F 17/00; G09F 13/0431; G09F 13/0448; G09F 2017/005; G09F 13/04; G09F 2013/222; E04H 12/32; E04H 12/24

See application file for complete search history.

(56) References Cited

U.S. PATENT DOCUMENTS 1,171,917 A * 2/1916 Axford .................. F21V 33/00 116/173
1,509,379 A * 9/1924 Sims ...................... G09F 21/04 40/572
1,712,355 A * 5/1929 Price ...................... G09F 13/06 40/572
1,740,747 A * 12/1929 Price ...................... G09F 23/00 362/327
2,058,900 A 10/1936 McDonald
D117,096 S 10/1939 Good et al.
2,280,817 A 4/1942 Freeman
2,523,290 A 9/1950 Gardner (Continued)

FOREIGN PATENT DOCUMENTS

FR 716363 A * 12/1931

OTHER PUBLICATIONS

International Search Report for International Application No. PCT/US2022/028008, Aug. 18, 2022, 9 pages.

(Continued)

*Primary Examiner* — Kristina M Deherrera
*Assistant Examiner* — Tania Courson
(74) *Attorney, Agent, or Firm* — Thomas G. Ference

(57) ABSTRACT

An illuminated flag, the flag includes a first layer of flag, a second layer of flag and a spacer separating the first and second flag layers to form an optical cavity between the first and second flag layers. A light source is contained within the optical cavity to illuminate the first and second layers. A light distribution element between the light source and layers of the flag distributes the light uniformly upon the inside of the layers. This illumination from within the flag provides a substantially uniform glow to the exterior of the flag. The flag can be supported by a standard flag pole and is able to move in a breeze.

12 Claims, 43 Drawing Sheets

(56) References Cited

U.S. PATENT DOCUMENTS

| | | | | |
|---|---|---|---|---|
| 2,639,528 | A * | 5/1953 | Ochsner | G09F 13/00 362/812 |
| 3,305,961 | A | 2/1967 | Lanzon et al. | |
| 3,617,727 | A * | 11/1971 | Balfour-Lynn | G02B 6/0046 362/20 |
| 4,075,775 | A | 2/1978 | Shorette | |
| 4,164,008 | A | 8/1979 | Miller et al. | |
| 4,385,343 | A * | 5/1983 | Plumly | G02B 6/0021 362/559 |
| D284,486 | S | 7/1986 | Gransden | |
| D307,300 | S | 4/1990 | Morelle | |
| D310,576 | S | 9/1990 | Narbut et al. | |
| 5,027,258 | A * | 6/1991 | Schoniger | G02B 6/0023 362/800 |
| D341,567 | S | 11/1993 | Acker et al. | |
| D342,845 | S | 1/1994 | Rudd et al. | |
| 5,390,436 | A * | 2/1995 | Ashall | G02B 6/0061 362/618 |
| 5,640,792 | A * | 6/1997 | Smith | G02B 6/0026 362/800 |
| 5,826,535 | A * | 10/1998 | Shaw | G09F 17/00 40/212 |
| 5,950,340 | A | 9/1999 | Woo | |
| 6,192,824 | B1 | 2/2001 | Chang | |
| 6,240,664 | B1 | 6/2001 | Hjaltason | |
| 6,286,970 | B1 * | 9/2001 | Egawa | G02B 6/0028 362/558 |
| 6,621,973 | B1 * | 9/2003 | Hoffman | G02B 6/0096 385/125 |
| D483,413 | S | 12/2003 | Merenlender | |
| 6,811,895 | B2 * | 11/2004 | Murasko | G09F 21/02 313/506 |
| D507,843 | S | 7/2005 | Calimlim | |
| 7,192,168 | B2 | 3/2007 | Day | |
| 7,303,310 | B2 * | 12/2007 | You | F21V 23/02 362/240 |
| D562,406 | S | 2/2008 | Metzler | |
| D573,499 | S | 7/2008 | King et al. | |
| D594,666 | S | 6/2009 | Chen | |
| D653,163 | S | 1/2012 | Dunn | |
| 8,146,278 | B1 * | 4/2012 | Grant | G09F 17/00 40/591 |
| D669,938 | S | 10/2012 | Lard et al. | |
| 8,291,631 | B2 * | 10/2012 | Wilder | G09F 1/065 40/760 |
| 8,839,736 | B2 * | 9/2014 | Bort | G09F 13/16 116/173 |
| D729,116 | S | 5/2015 | Riccobono | |
| D751,648 | S | 3/2016 | Gongola et al. | |
| 9,396,673 | B2 * | 7/2016 | Bort | G09F 27/007 |
| 9,454,921 | B2 * | 9/2016 | Williams | G01P 13/02 |
| 10,088,142 | B1 * | 10/2018 | McGrath | F21V 15/015 |
| 10,697,621 | B1 | 6/2020 | Zoltie | |
| 10,699,606 | B2 * | 6/2020 | Webb | G09F 13/22 |
| D894,619 | S | 9/2020 | Blackrock et al. | |
| 10,783,812 | B1 | 9/2020 | Hamami | |
| D901,591 | S | 11/2020 | Elmer | |
| 10,871,278 | B1 | 12/2020 | Zoltie | |
| D916,973 | S | 4/2021 | Dunn | |
| 10,995,916 | B1 | 5/2021 | Murphy | |
| 11,277,010 | B2 * | 3/2022 | Chien | F21V 33/0004 |
| D1,025,828 | S * | 5/2024 | Ference | D11/165 |
| D1,033,272 | S * | 7/2024 | Ference | D11/165 |
| 2001/0018809 | A1 * | 9/2001 | Heropoulos | G09F 13/22 40/544 |
| 2004/0083633 | A1 | 5/2004 | Mueller | |
| 2004/0160788 | A1 * | 8/2004 | Wagner | G09F 21/04 362/565 |
| 2006/0065182 | A1 | 3/2006 | Campbell et al. | |
| 2008/0104870 | A1 | 5/2008 | Alden | |
| 2009/0151212 | A1 * | 6/2009 | Cadavis | G09F 7/18 40/611.07 |
| 2011/0236220 | A1 | 9/2011 | Benson et al. | |
| 2012/0014104 | A1 | 1/2012 | Morris et al. | |
| 2012/0017822 | A1 | 1/2012 | Bort | |
| 2012/0113625 | A1 | 5/2012 | Werner et al. | |
| 2012/0260842 | A1 * | 10/2012 | King | G09F 21/04 116/174 |
| 2012/0301301 | A1 * | 11/2012 | Sauer | F03D 3/062 416/170 R |
| 2014/0301083 | A1 | 10/2014 | Cobane | |
| 2014/0340234 | A1 | 11/2014 | Wojnarski et al. | |
| 2021/0304646 | A1 | 9/2021 | Azorin | |
| 2022/0358860 | A1 | 11/2022 | Ference | |

OTHER PUBLICATIONS

Flag Pro, No Date Available, Euro Display, Site Visited on May 30, 2023: https://www.eurodisplay.com/en/prod/flag-pro-the-led-flag-sign.html (Year 2023).

Signs and Flags, No Date Available, Pixus, Site Visited on May 30, 23: https://pixus.com/products-services/signs-flags/ (Year 2023).

Blade Signs or Flag Mount, No Date Available, Site Visited on May 30, 2023: https://greensignco.com/s30/Blade-Signs-or-Flag-Mount (Year 2023).

* cited by examiner

ILLUMINATED FLAG

CROSS-REFERENCE TO RELATED APPLICATIONS

This application claims the benefit of priority of U.S. Provisional Patent Application No. 63/185,453, filed on May 7, 2021, the disclosure of which is herein incorporated by reference. This patent application is also related to U.S. Design Pat. No. D1,033,272, filed on May 6, 2022, which is a continuation in part of U.S. Design Pat. No. D1,025,828, filed on May 7, 2021, the disclosures of which are both incorporated herein by reference.

FIELD

The present invention generally relates to an illuminated flag. More specifically, the invention relates to a flag that is illuminated from within the flag and provides a substantially uniform glow to the exterior of the flag, the flag can be supported by a standard horizontal or angled flag pole, and the flag is able to still move in a breeze.

BACKGROUND

Traditional illumination of a flag after dark has occurred primarily by projecting illumination from the ground or some nearby structure onto the flag. This process lights the flag as well as the flag pole and surrounding area. Although this method of illumination allows one to view the flag at night, the extra light also illuminates the surroundings and tends to mute what would otherwise be a very striking image if just the flag by itself were only illuminated.

Some attempts have been made to have only the flag itself illuminated. These attempts have included projecting light from the flagpole onto the flag. This arrangement creates both a bright flag pole and a non-uniformly lit flag. Again, it fails to generate the image of only the flag being lit. Another attempt involves creating a rigid box in the shape of a flag. This arrangement holds lights within the box and has outside panels with the image of a flag. Though the image of the flag is illuminated, the ridge box structure is bulky, not free flowing, and does not lend itself to use with standard flag poles. Another attempt involves making a flag out of neon lights; here again the flag is bulky, rigid, non-uniformly lit, and not adaptable with standard flag poles. Still other attempts involve placing strings of small lights in the shape of a flag, the strings of lights can be free standing, in contact with or sandwiched between layers of fabric in the shape of a flag. In all of these string of lights arrangements; however, the image of the flag is produced by discrete points of light and does not give the image of a uniformly lit flag. In still yet another attempt, the flag requires a special flag pole with a special interface to transmit light to the flag, the interface holds the flag rigidly in place and is not free flowing.

To date the illumination of a flag, other than by the projection of light externally upon the flag, has offered only limited improvements for illuminating a flag. The alternative options still have many deficiencies such as being rigid structures, non-uniform illumination, or require the flag to have special support structures and interfaces. As a result, these improvements are ineffective in generating a freely flowing and uniformly illuminated flag. The main objective of the present invention is to provide a new structure for an illuminated flag that provides uniformity of illumination of only the flag, can easily be scaled to any size flag, allows the flag to be free flowing, and can still be integrated with standard flag hanging means and flag poles.

SUMMARY

In one implementation, the present disclosure is directed to an illuminated flag. The flag comprises a first layer of flag, a second layer of flag and a spacer separating the first and second flag layers to form an optical cavity between the first and second flag layers. The flag further comprises a light source within the optical cavity to illuminate the first and second layers of the flag from within the optical cavity. The flag may further comprise a light distribution element to adjust the illumination uniformity of the flag. The flag may still further comprise cavity shaping elements that keep flexible layers of the flag spaced apart for optimal shaping of the optical cavity.

In another implementation, the present disclosure is directed to an illuminated flag. The flag comprises a first layer of flag, a second layer of flag, a first spacer, a second spacer and a light source. The first spacer and second spacer are separated to support the first layer of flag and the second layer of flag to create an optical cavity. The light source is placed within the optical cavity to illuminate the first and second layers of the flag. The flag may further comprise a light distribution element to adjust the illumination uniformity of the flag.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 24*d* is top view of the illuminated flag in FIG. 26*a;*

DETAILED DESCRIPTION

Figure 1:
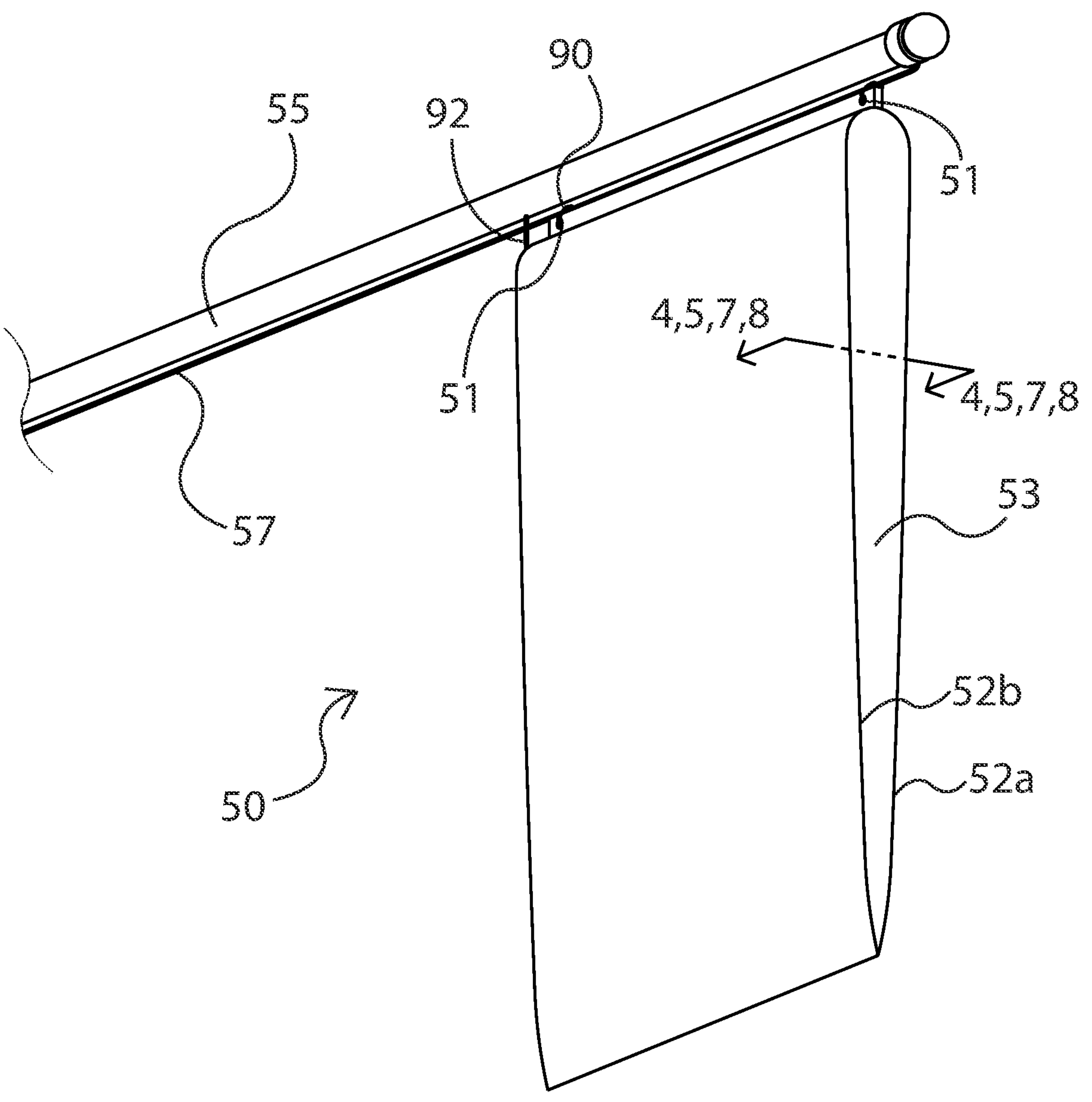
FIG. 1 is perspective view of one embodiment of an illuminated flag in accordance with the present invention.

An illuminated flag 50 is illustrated in FIGS. 1-40*b*. Illuminated flag 50 comprises a first layer of flag 52*a*, a second layer of flag 52*b*, and a spacer 54 for separating the first and second flag layers to form an optical cavity 56 between the first and second layers. A light source 58 is placed within optical cavity 56 to illuminate first flag layer 52*a* and second flag layer 52*b* from within the optical cavity. Light source 58 may include a variety of components associated with the light source such as LEDs 59, encapsulant 61, circuit board 70, etc. Optical cavity 56 is shaped so that light 60 emanating from light source 58 can impinge the inside surface of substantially the entire optical cavity and provide a uniform glow illuminating flag 50 from within. In one embodiment illuminated flag 50 is preferably rectangular to mimic a standard flag with a shape having four edges: a top edge, a bottom edge and two side edges, FIG. 1. Flag 50 may also take on other shapes such as triangular and semi-circular and have different types of edges. Flag 50 may have grommet holes 51 for securing the flag to flag pole 55 via cable/cord 57. Flag 50 may be supported by other means or connected as a plurality of flags to long create banners.

First layer 52*a* and second layer 52*b* can be fabricated from standard flag material such as, but not limited to, polyester or nylon woven material, thin plastic sheet, etc. Flag layer 52*a* and 52*b* are preferably flexible layers that can easily be shaped and flow under the effect of wind. The flag material should be translucent so as to allow a high percentage of light 60 impinging upon the inside of the flag layers to exit the flag material to form a brightly glowing external surface for flag 50. The flag material may have colors and patterns incorporated into or on the flag material so that light impinging the flag material will take on the colors of the flag material to allow an external observer to see those colors glowing on the external surface for the flag. The flag material may be holographic elements that provide for three dimensional images viewed within the flag.

First flag layer 52*a* and second flag layer 52*b* may be stitched, glued or fastened together by any means to create optical cavity 56. First flag layer 52*a* and second flag layer 52*b* may also be created from a single sheet of material that is folded or bent at one edge of flag 50 to create the two layers. The flag layers surround light source 58 and spacer 54. The flag layers create a 3-dimensional flag having an inner and outer flag surface. In some embodiments, one or more side layers 53 (53*a* and 53*b*) may be included to complete optical cavity 56 and provide for different shapes to illuminated flag 50. Shapes for the flag may be any shape, but preferably a rectangular wedge that mimics most closely a standard flag. Side layers 53 may be translucent allowing similar amounts of light through that flag layers 52 allow through.

Figure 2A:
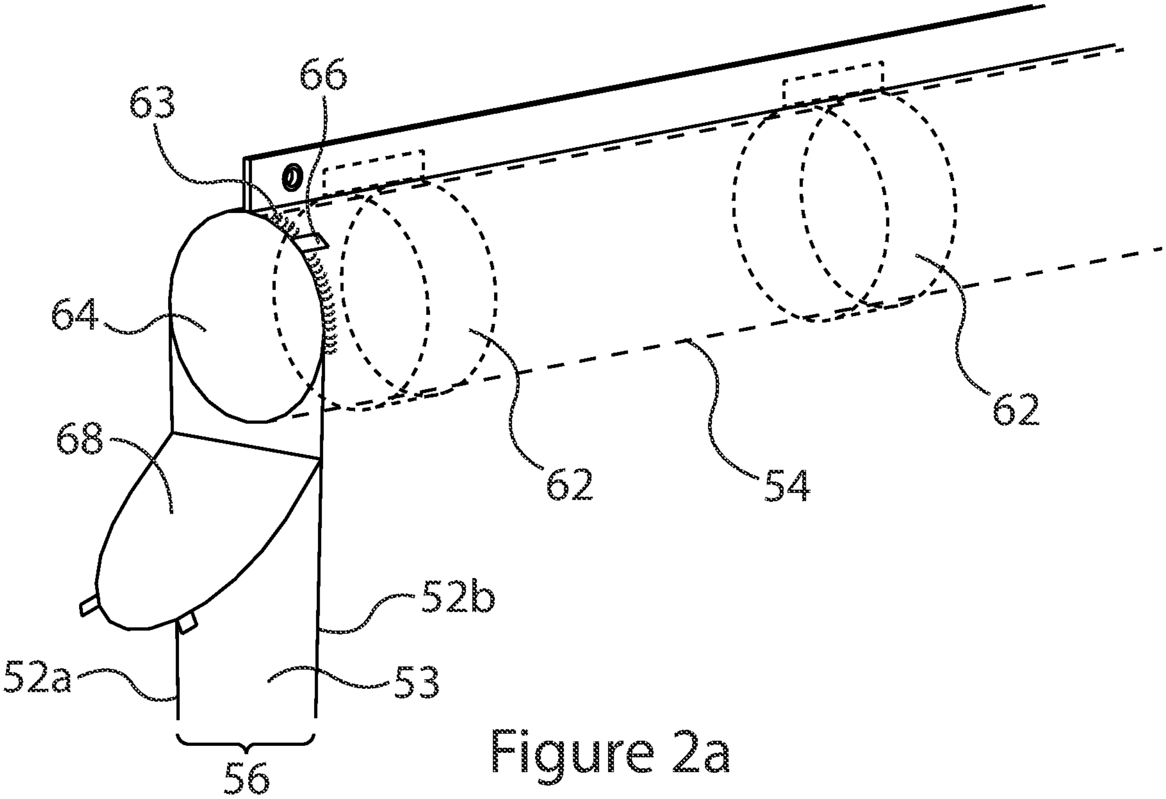
FIG. 2*a* is a partially transparent, enlarged view of the illuminated flag in FIG. 1 showing the spacer for separating the first and second layers of flag, the light source, and an open port for access to the spacer and light source.
Figure 2B:
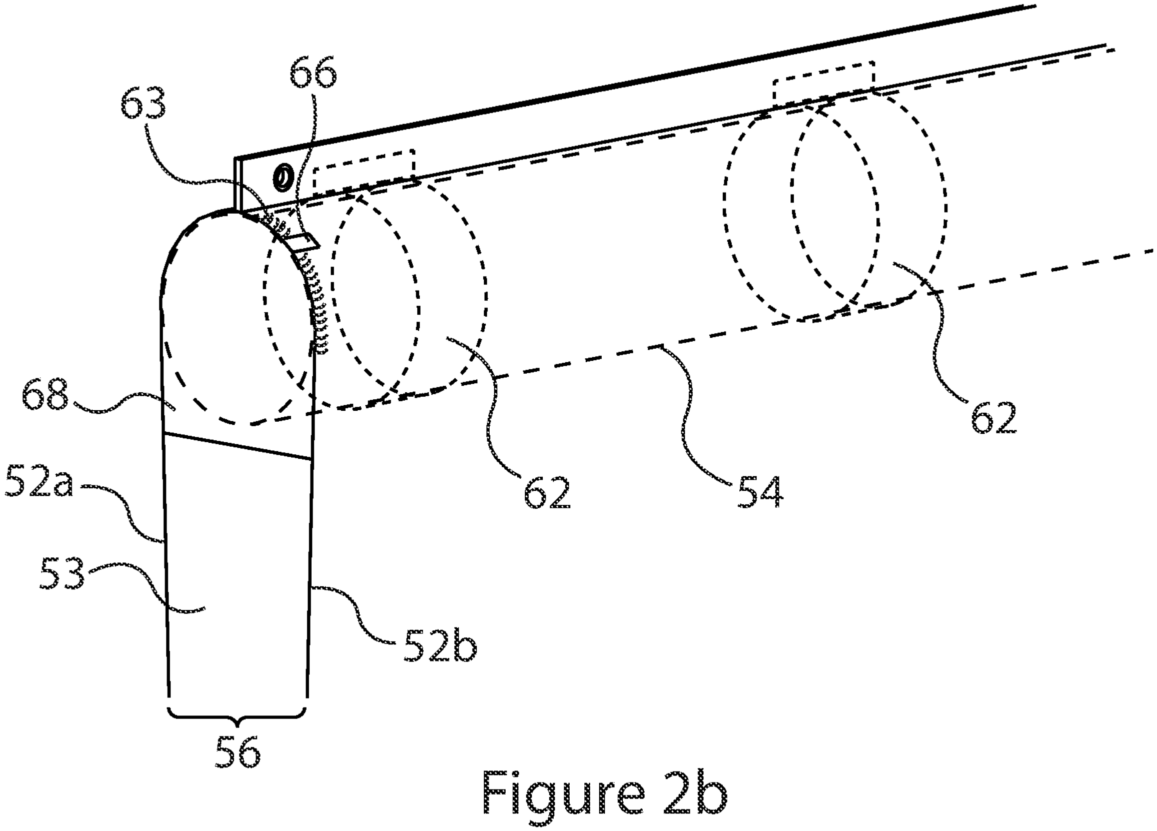
FIG. 2*b* is a partially transparent, enlarged view of the illuminated flag in FIG. 2*a* with the port closed.
Figure 3A:
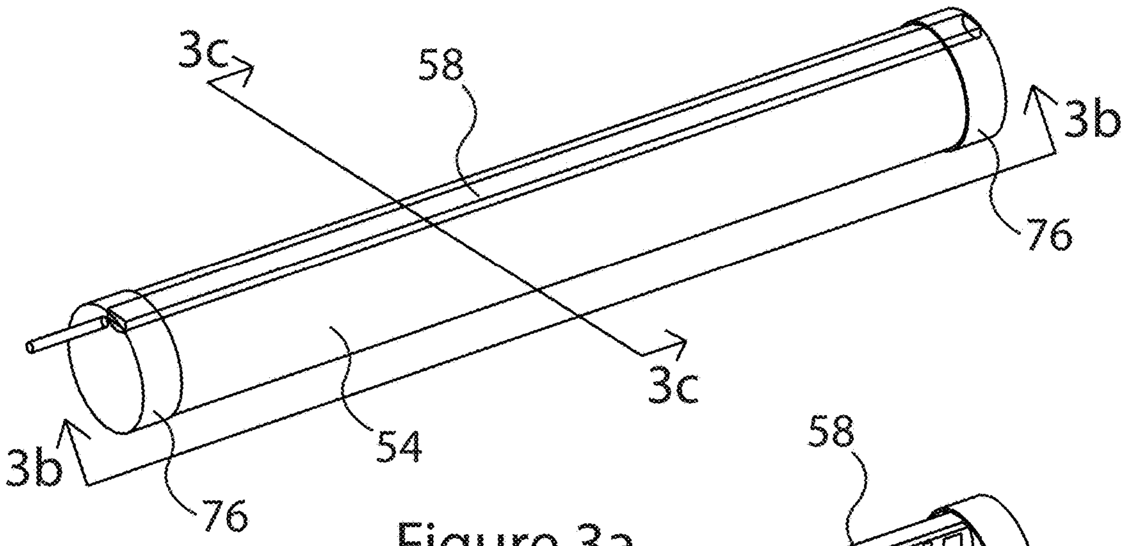
FIG. 3*a* is a perspective view of the spacer and light source arrangement of FIG. 1.
Figure 3B:
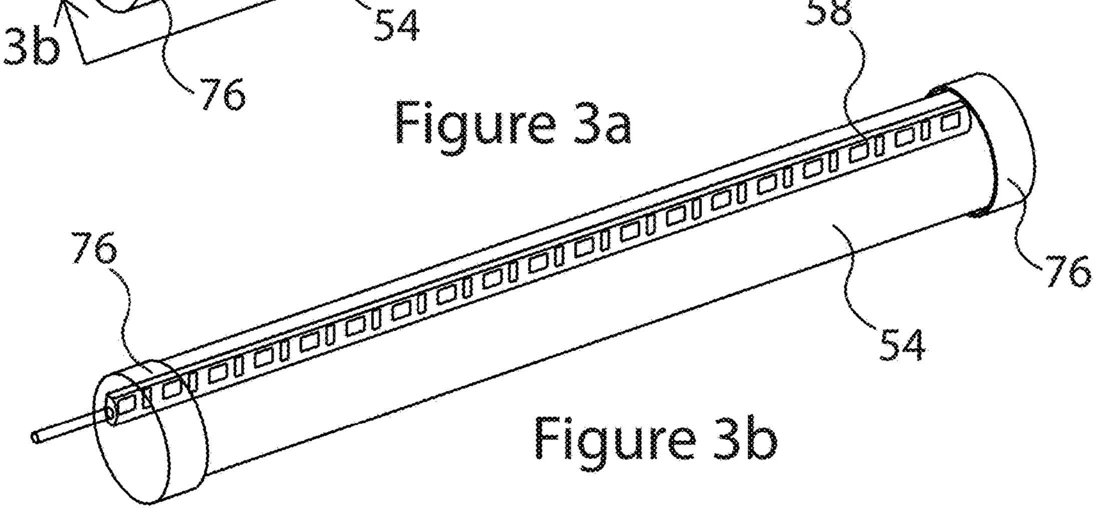
FIG. 3*b* is a rotated view of the spacer and light source arrangement of FIG. 3*a* as viewed along line 3*b*-3*b* of FIG. 3*a;*
Figure 3C:
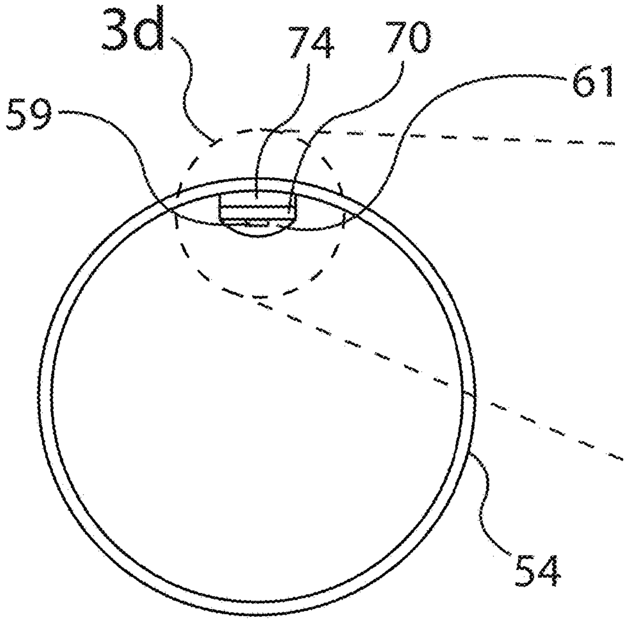
FIG. 3*c* is sectional view along line 3*c*-3*c* of FIG. 3*a;*
Figure 3D:
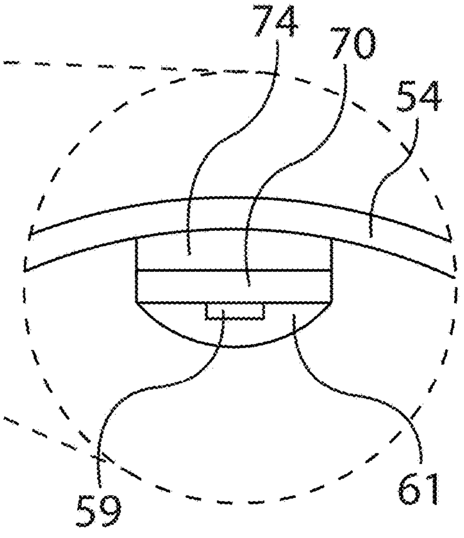
FIG. 3*d* is enlarged view of the light source in FIG. 3*c;*

Optical cavity 56 includes at least one spacer 54, FIG. 2, for helping to shape optical cavity 56. Spacer 54 should be an optically transparent spacer that is fabricated from an optically transparent material so as not to interfere with light transmission within optical cavity 56. Spacer 54 purpose is to separate first flag layer 52*a* and second flag layer 52*b* so that light 60 can travel between the flag layers and be uniformly distributed on the inside of optical cavity 56. In a preferred embodiment, spacer 54 is located towards one edge/end of flag 50. For example, spacer 54 is located within the top edge of flag 50. In one embodiment, spacer 54 is an optically transparent hollow tube. In a preferred embodiment, spacer 54 is an optically transparent cylindrical tube. However, spacer 54 may take on other cross-sectional shapes. Spacer 54 may also be something other than a tube, a spacer that is still configured to keep the two flag layers apart to make optical cavity 56. Spacer 54 may be secured within optical cavity 56 by spacer supports 62. Spacer supports 62 are preferably optically transparent spacer supports that do not interfere with distributing light. Spacer 54 may also be glued, sewn by stiches 63, stapled or attached by any other fastening means to the flag material. A spacer access opening 64 may also be provided within the body of the flag layers to allow for moving spacer 54 in and out of flag 50 or allow other components to be inserted or removed from either the spacer or the optical cavity 56. Spacer access opening 64 may further have spacer access fasteners 66 to secure spacer access flap 68.

Light source 58 is generally located within optical cavity 56 along the edge of flag 50 having the largest spacing between first and second flag layers 52*a* and 52*b*. In this location, light 60 may be distributed to impinge upon the entire interior surface of optical cavity 56. Light source 58 is preferably and LED light strip including a plurality of individual light sources. LED light strip includes a circuit board 70 (which may be flexible), optically transparent encapsulant 61, and adhesive 74. In one embodiment, light source 58 is secured to the inner wall of spacer 54, FIG. 3*a-d*. By locating light source 58 within a hollow tube and capped with end caps 76 (76*a* and 76*b*), the light source can be hermetically sealed and protected from the elements of inclement weather.

Figure 4:
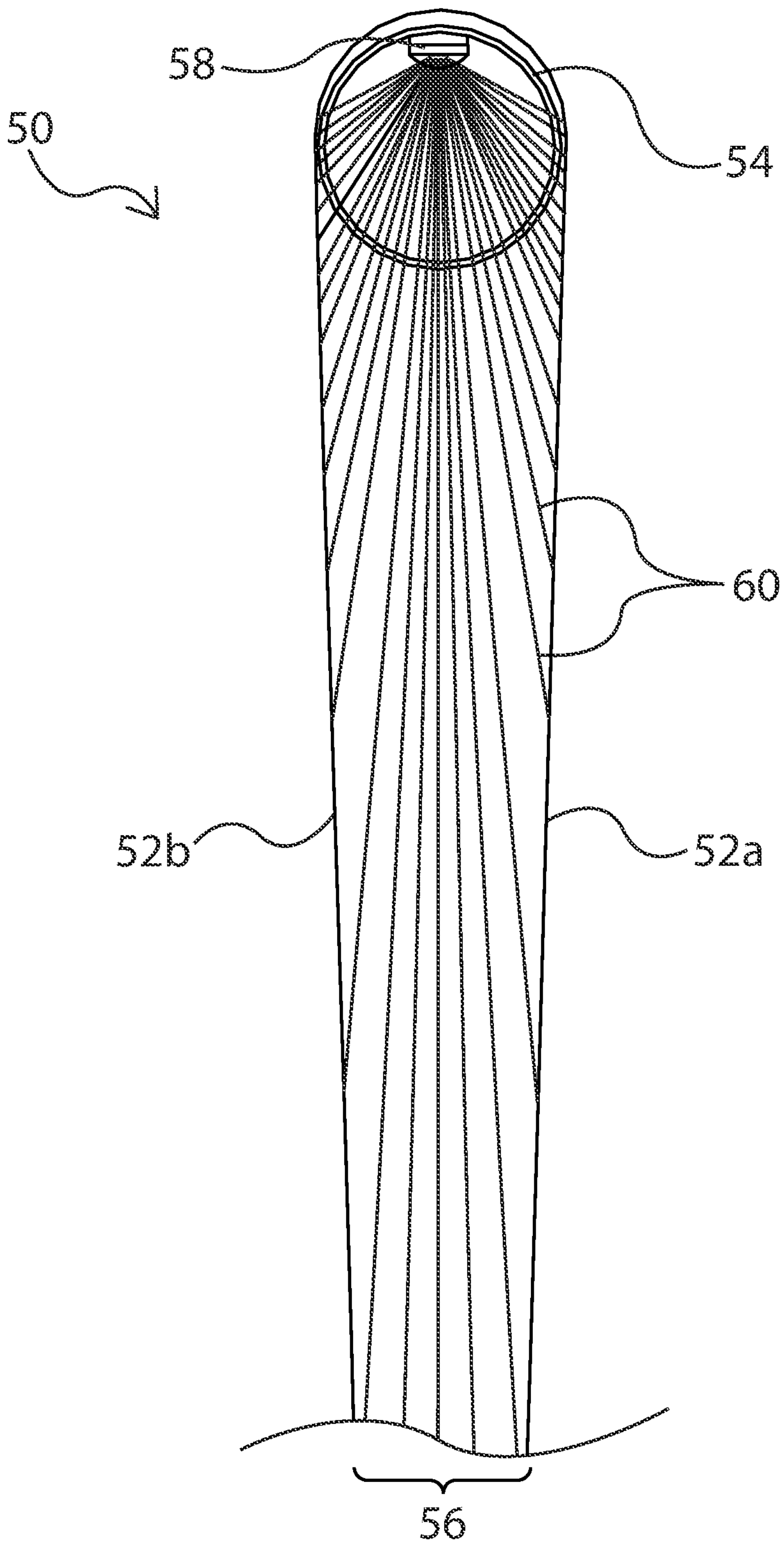
FIG. 4 is a side, sectional view along line 4-4 of FIG. 1, schematically showing the distribution of light coming from a LED light source and impinging with non-uniform light intensity along the inside of the first and second layers of the flag because the light intensity distribution is dropping off with increased distance from the light source.

Any light source 58 will have its own specific distribution of light 60 intensity. Some light sources can provide 360-degree uniform light in all directions. However, most LED light sources provide directional light in one direction with light divergence angles generally in the range of 30 to 120 degrees. One example for the distribution light 60 within optical cavity 54 for an LED light strip is shown in FIG. 4. One observes that the light 60 hitting the surface of the interior of the cavity 54 is non-uniform in intensity. Because the light intensity distribution drops off with increased distance from the light source, the flag layers 52*a* and 52*b* closer to the light sources have much more light impinging upon them and will look brighter to the observer than the layers furthest from the light source. To solve this issue, a light distribution element 80 can be located between the light source and the interior walls of the cavity.

Figure 5:
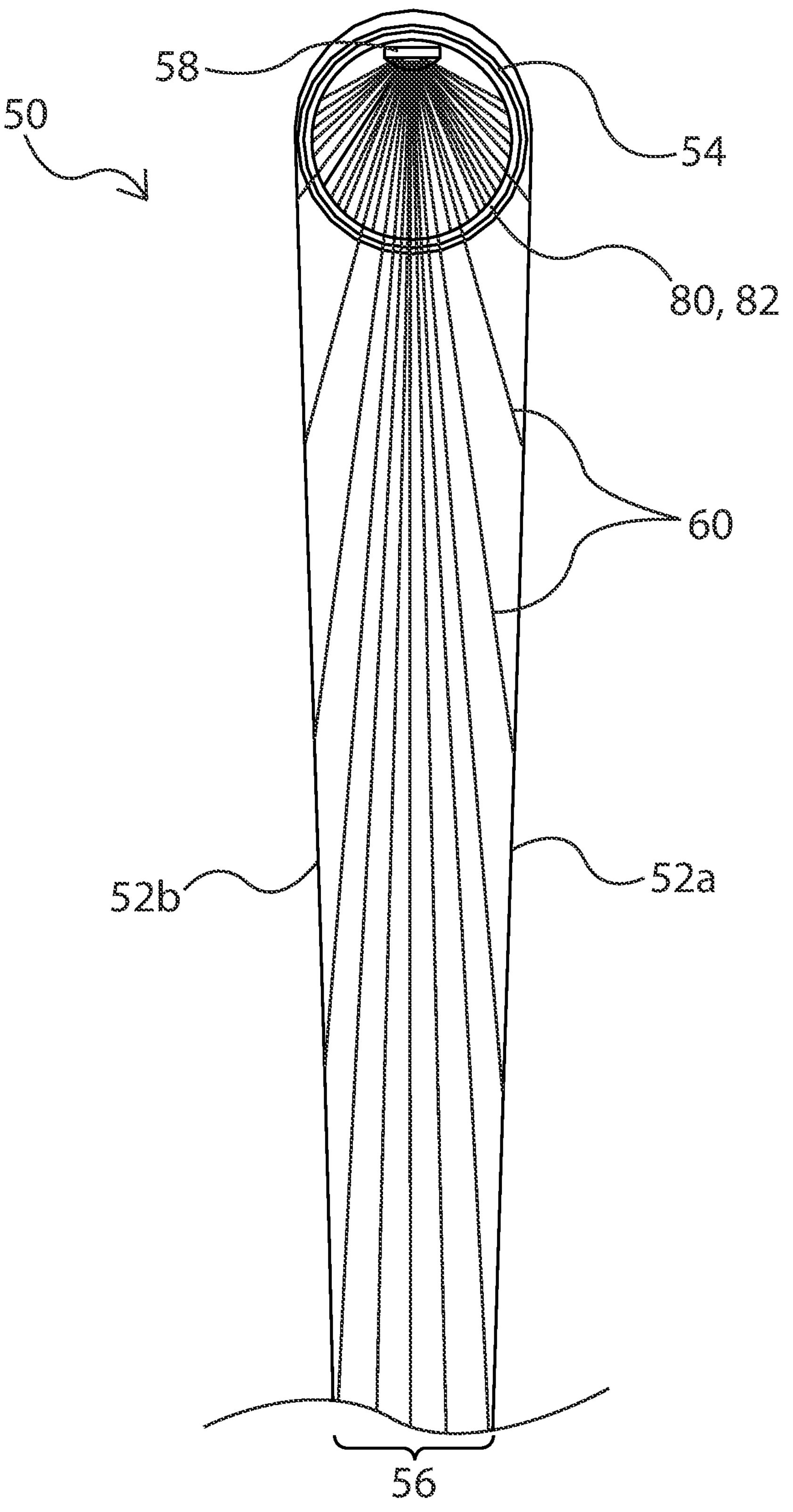
FIG. 5 is a side, sectional view along line 5-5 of FIG. 1, schematically showing the distribution of light coming from an LED light source and having a filter as a light distribution element, the filter producing substantially uniform light density along the inside of the first and second layers of the flag.
Figure 6A:
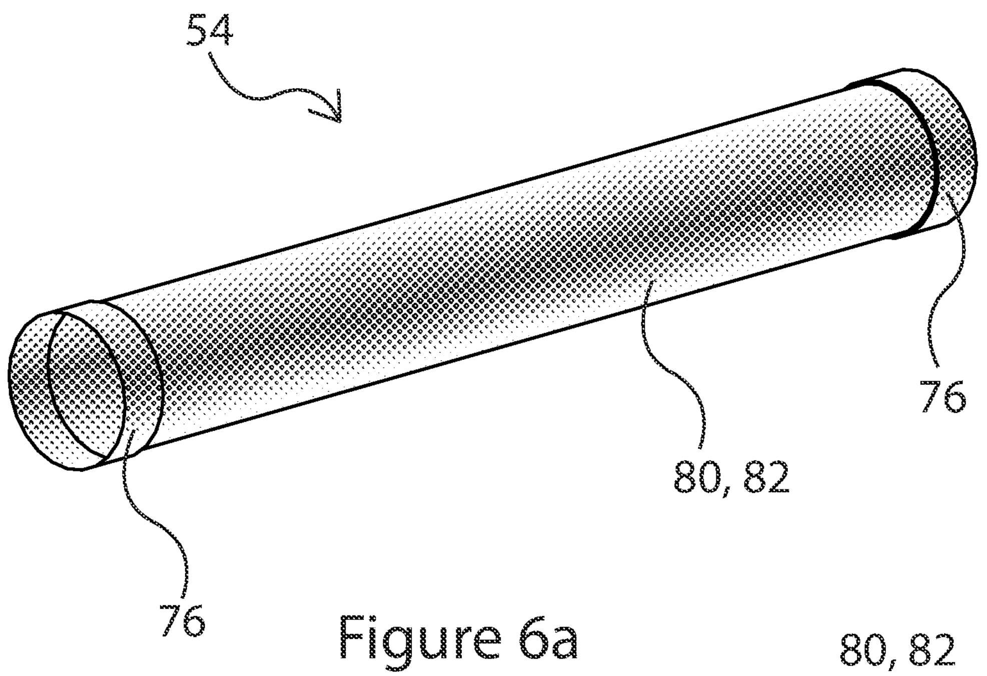
FIG. 6*a* is a perspective view of the spacer element of FIG. 5, showing the location of the filter.
Figure 6B:
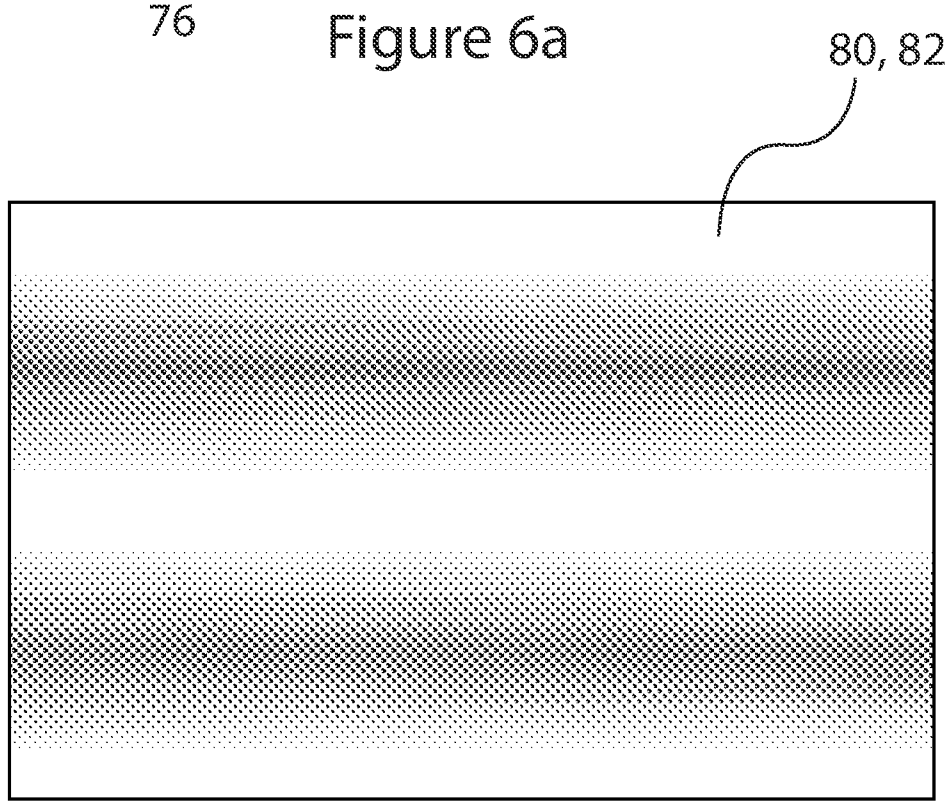
FIG. 6*b* is a flat plan view of the spacer element of FIG. 5 now separated from the spacer and flattened, showing one embodiment for the density distribution of the filter.

For example, FIG. 5 shows an illuminated flag 50 that further includes filter 82 for modifying the distribution of light that impinges the walls of the flag. In this embodiment more light is blocked for the closest walls dimming them to be more equal in intensity to the furthest walls. Filter 82 provides a more uniform density of light (light distribution) to the whole inside of the cavity. Filter 82 can be a neutral density filter with changing opacity or a filter made from a plurality of light blocking elements (such as opaque dots). Filter 82 can be fabricated by printing a continuously changing light blocking layer or patterned light blocking elements on transparent film. The light blocking layer or blocking elements may also have reflective properties as well. FIG. 6*b* shows filter 82 with one possible light blocking distribution. The filter sheet is then rolled up and inserted within spacer tube 54, FIG. 6*a*.

Figure 7:
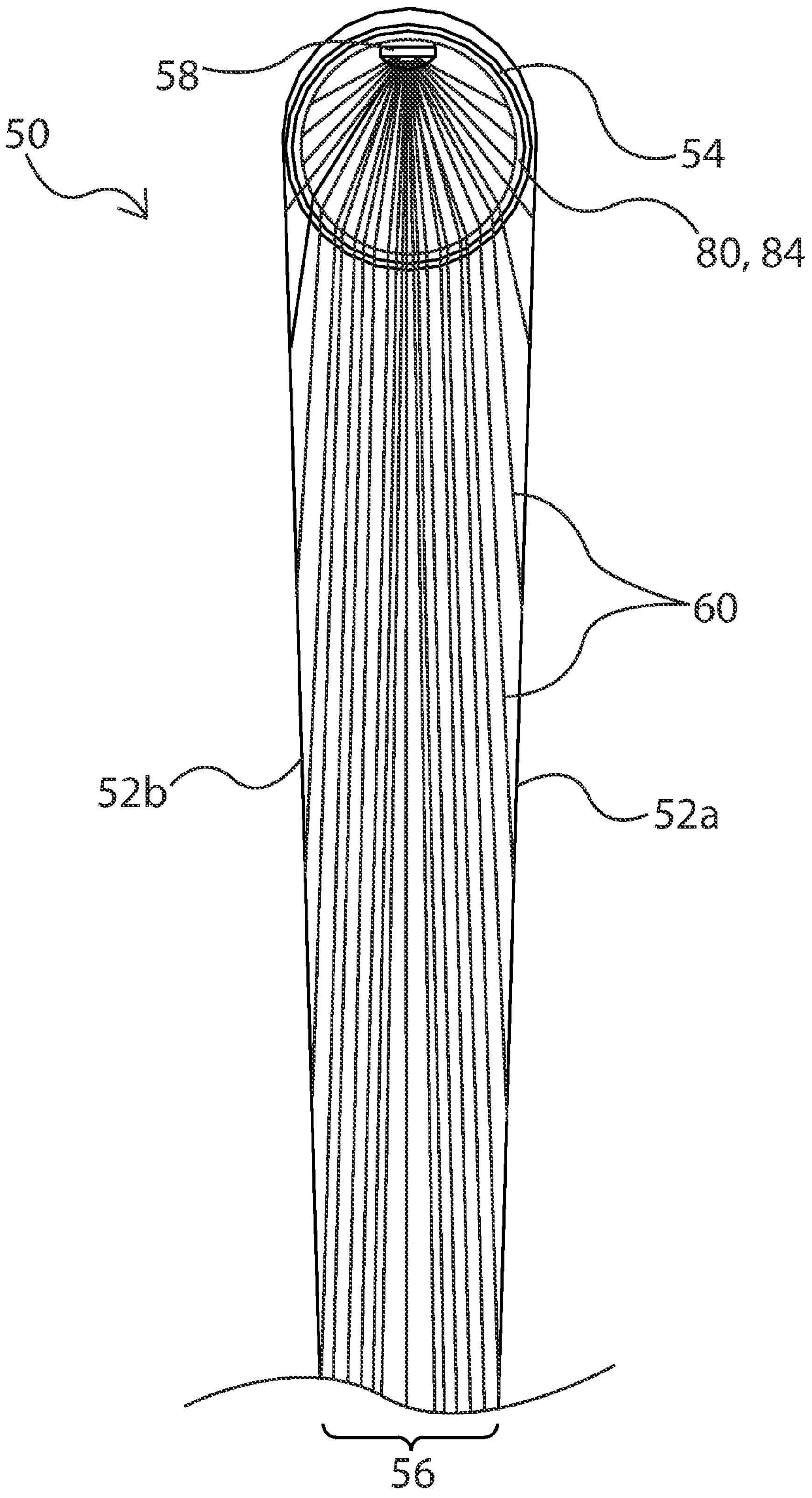
FIG. 7 is a side, sectional view along line 7-7 of FIG. 1, schematically showing the distribution of light coming from an LED light source and having a Fresnel lens as a light distribution element, the lens producing substantially uniform light density along the inside of the first and second layers of the flag.

In another embodiment, FIG. 7, a lens 84 may be used as light distribution element 80. In this embodiment, lens 84 is a Fresnel lens that redirects light 60 to be more equally distributed along the inside surface of the first and second flag layers 52*a* and 52*b*. The Fresnel lens may be an insert placed within spacer tube 54 or the spacer itself may be a Fresnel lens.

Figure 8:
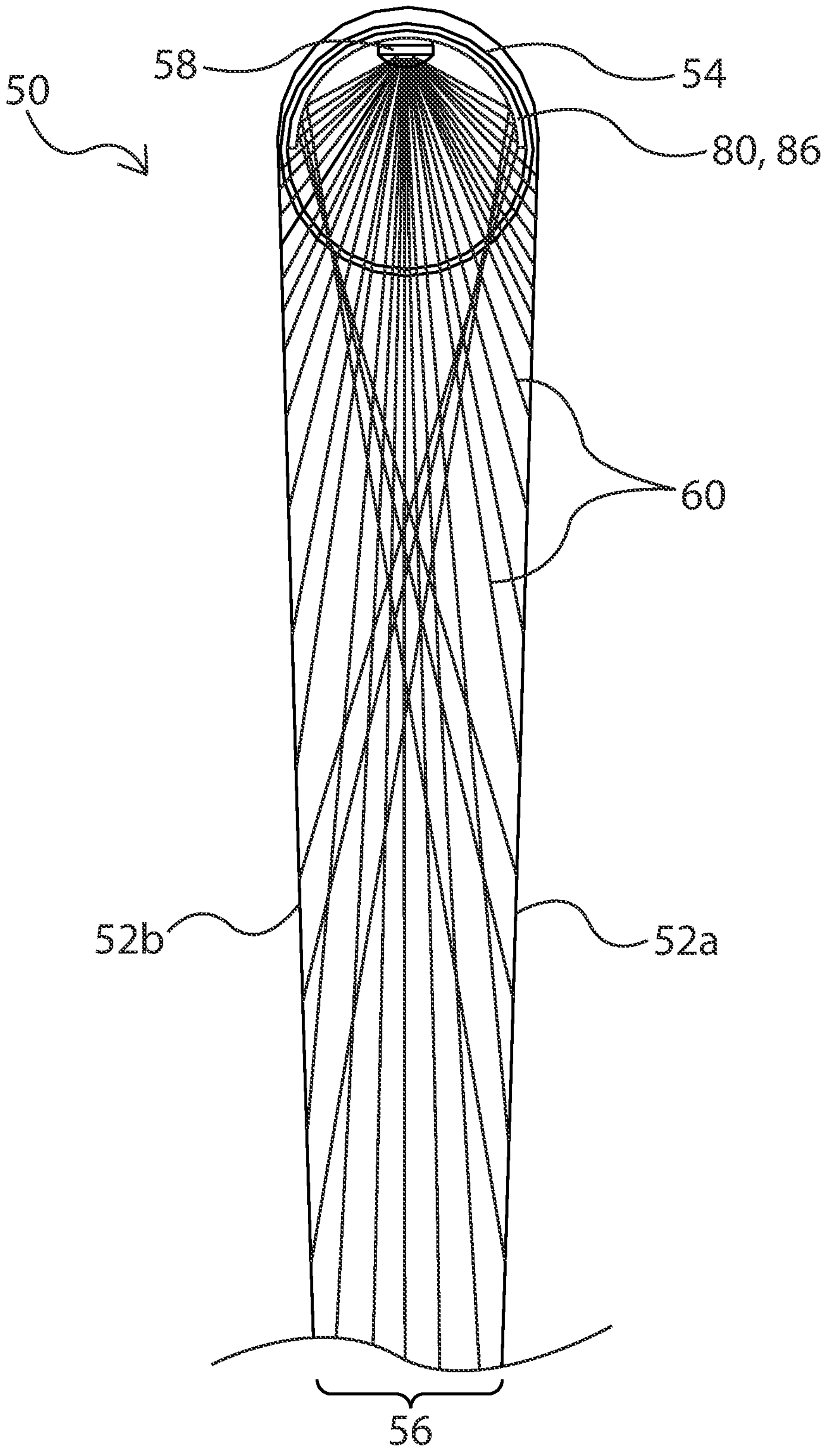
FIG. 8 is a side, sectional view along line 8-8 of FIG. 1, schematically showing the distribution of light coming from an LED light source and having a mirror as a light distribution element, the mirror producing substantially uniform light density along the inside of the first and second layers of the flag.
Figure 9A:
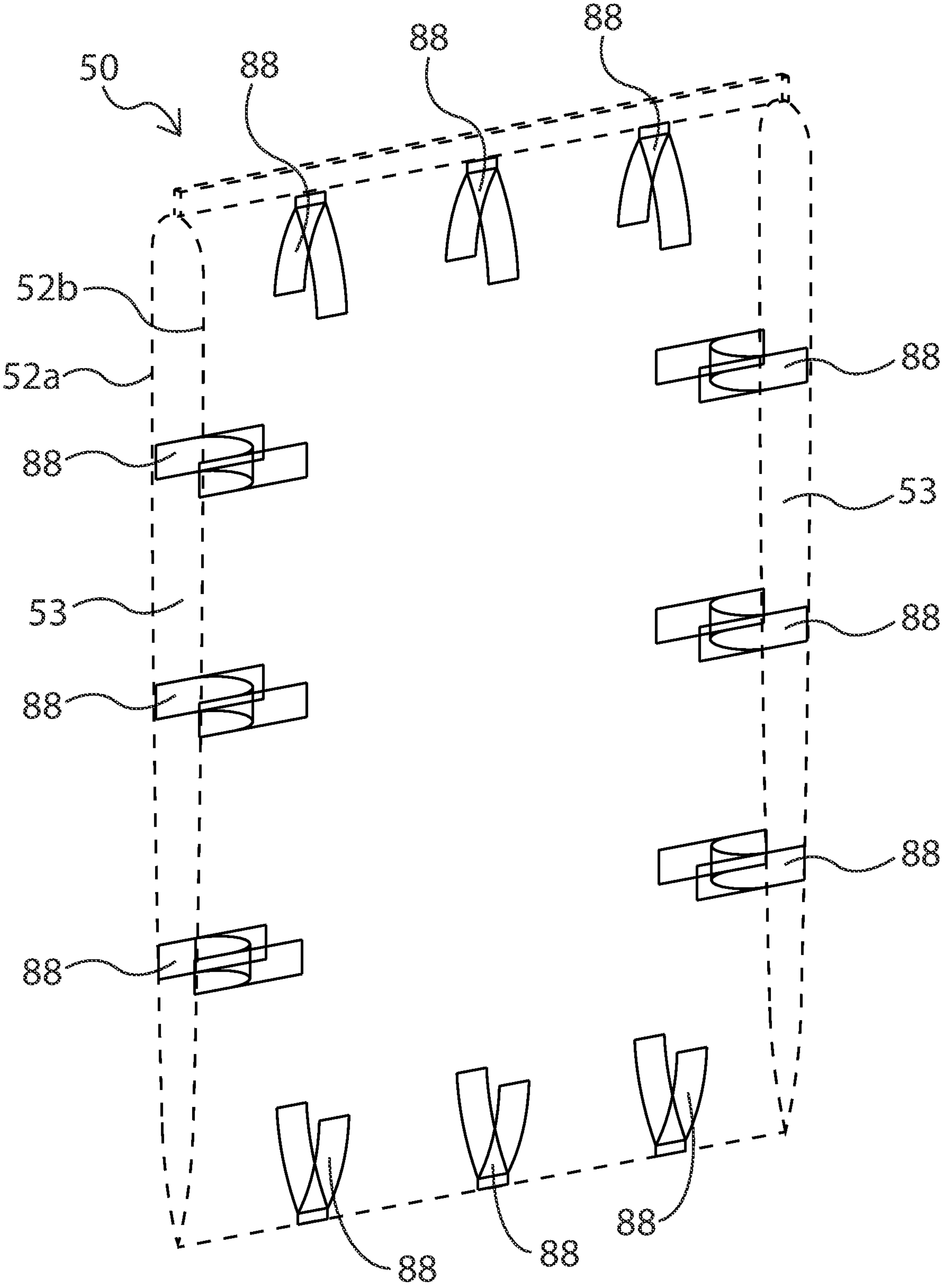
FIG. 9*a* is transparent view of the illuminated flag of FIG. 1, showing the location of a plurality of cavity shaping elements that help define the shape of the optical cavity.
Figure 9B:
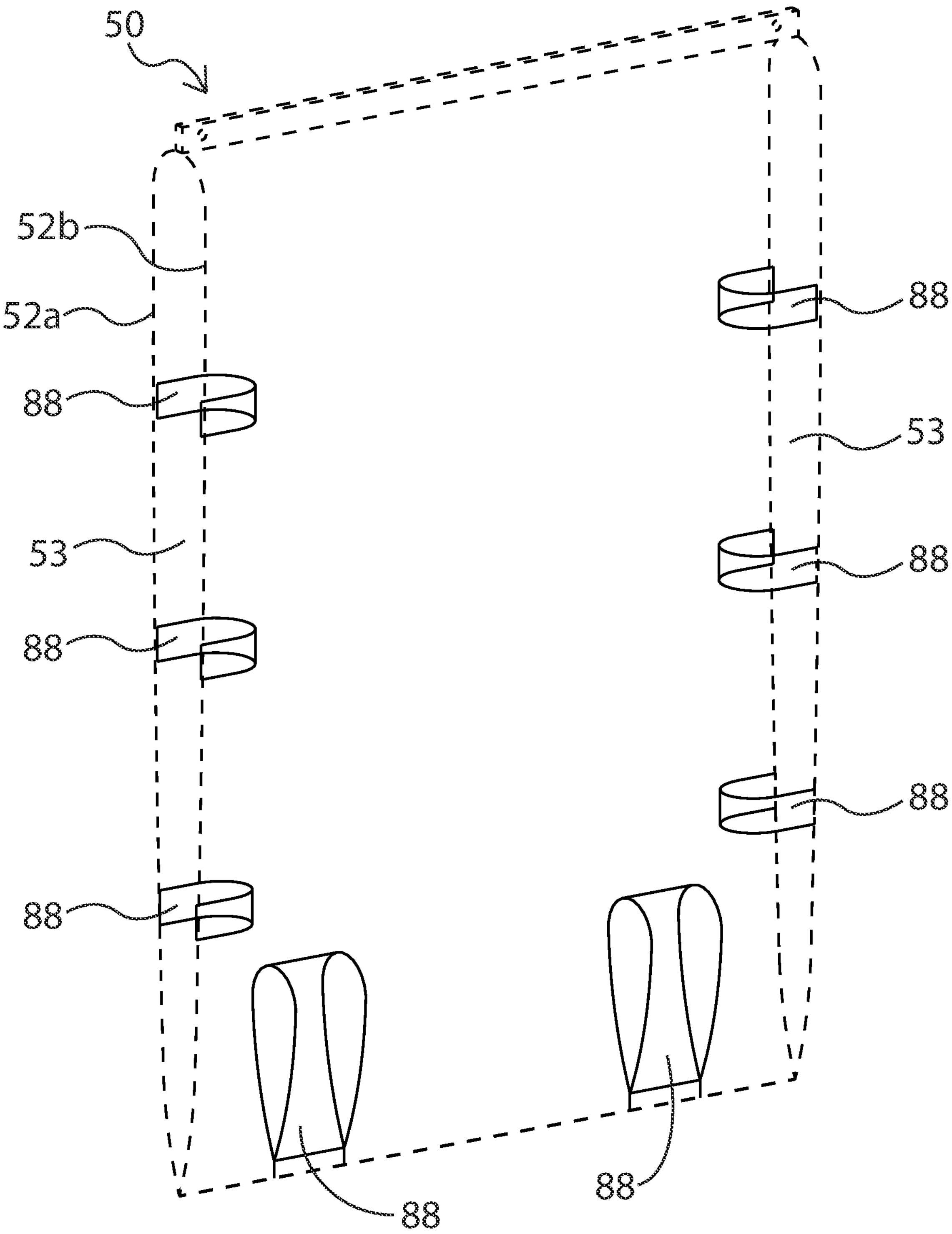
FIG. 9*b* is a transparent view of the an alternative embodiment to the illuminated flag in FIG. 9*a* with an alternative set of shaping elements that help define the shape of the optical cavity.
Figure 9C:
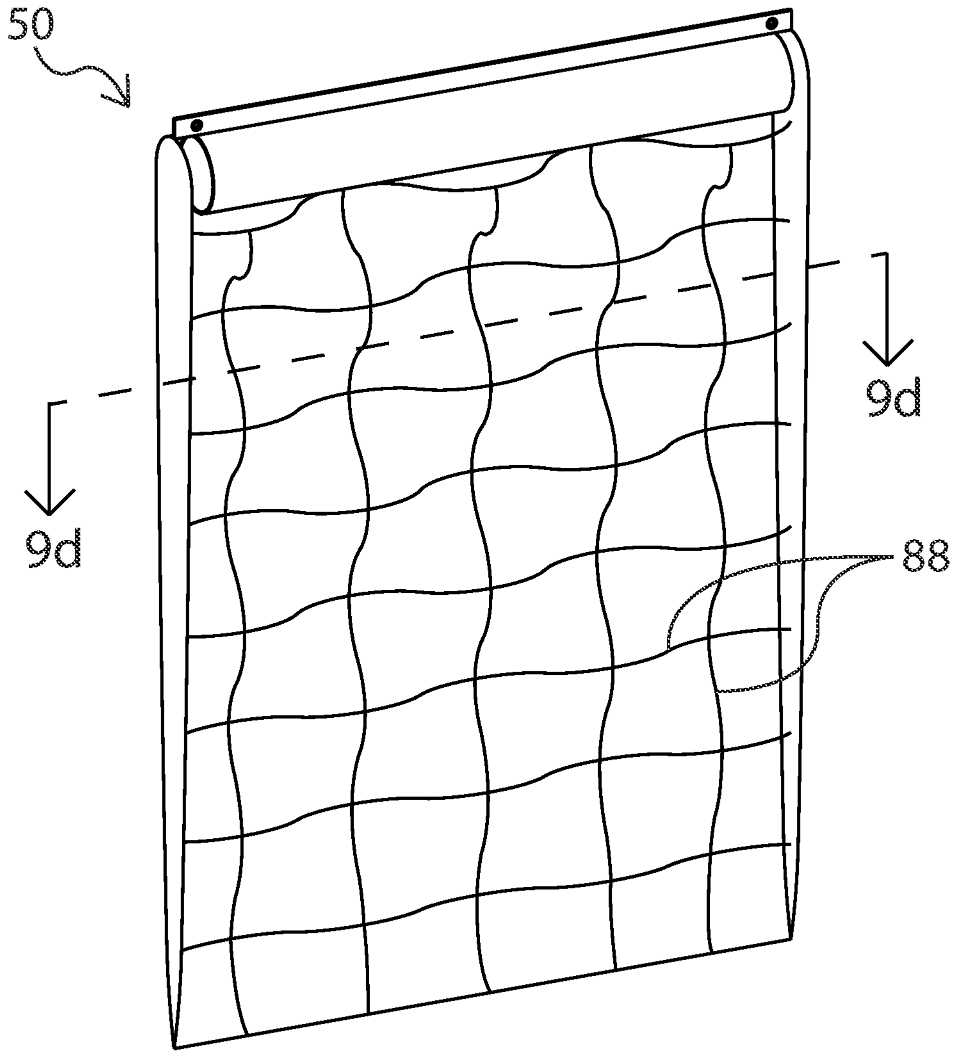
FIG. 9*c* is a transparent view of the an alternative embodiment to the illuminated flag in FIG. 9*a* with an alternative set of shaping elements that help define the shape of the optical cavity.
Figure 9D:
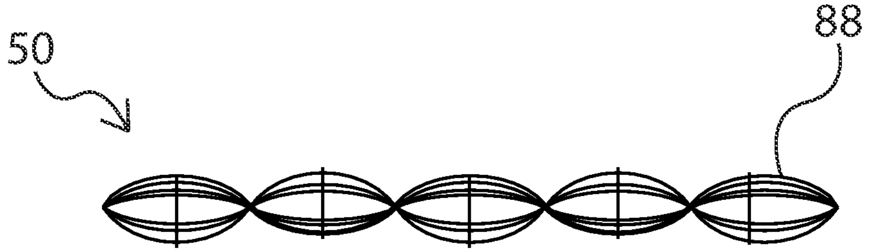
FIG. 9*d* is a sectional view along 9*d*-9*d* of FIG. 9*c* showing tops-down, sectional view of the shaping elements.

In still another embodiment, FIG. 8, a mirror 86 may be used as light distribution element 80. Mirror 86 redirects light 60 to be more equally distributed along the inside surface of the first and second flag layers 52*a* and 52*b*. The mirror may be a Fresnel mirror.

Figure 14A:
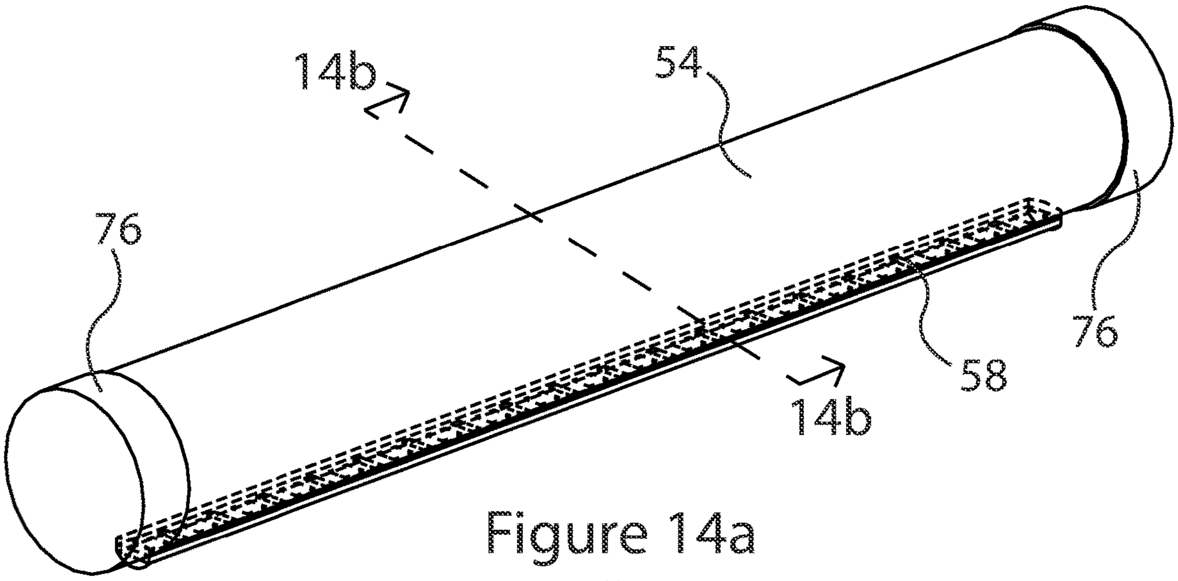
FIG. 14*a* is a perspective view of an alternative embodiment for the placement of a light source outside the spacer.
Figure 14B:
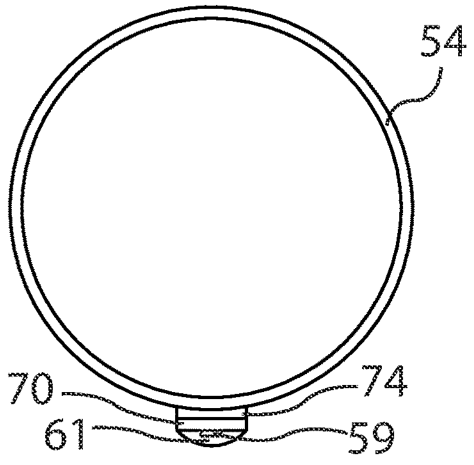
FIG. 14*b* is a sectional view along line 14*b*-14*b* of FIG. 14*a;*
Figure 14C:
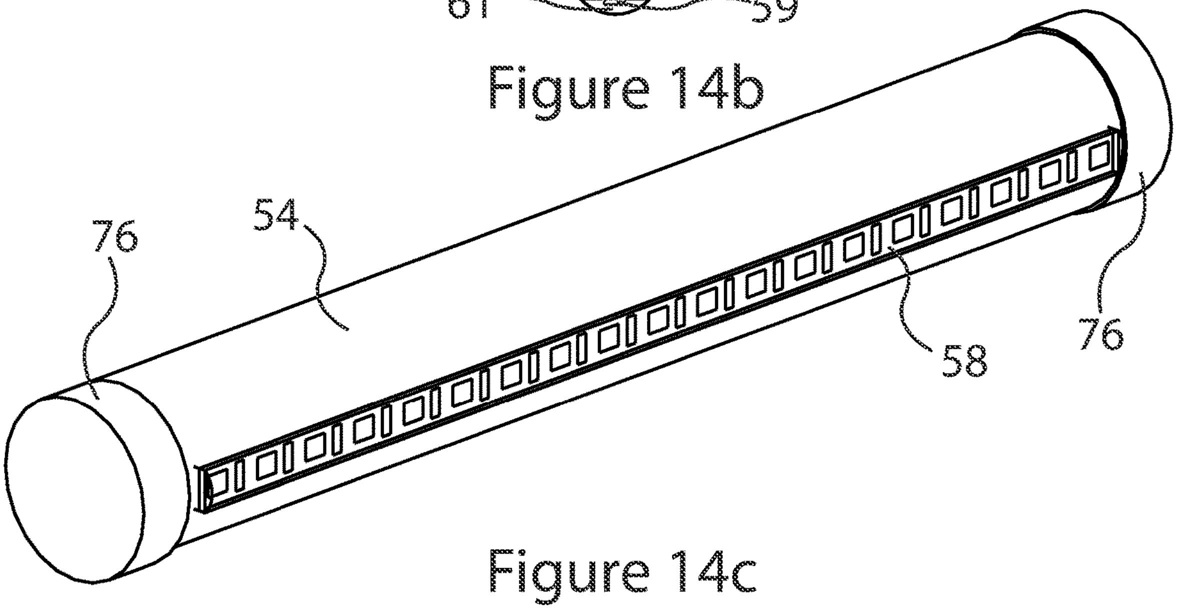
FIG. 14*c* is a rotated perspective view showing the LED light strip of FIG. 14*a;*

In another embodiment, FIGS. 14*a*-14*c*, light source 58 is mounted outside spacer 54. The light source 58 may additionally contain a light distribution element 80 integrated with the light source, such as a lens 82 or filter 84

The shape of optical cavity 56 and therefore the shape of flag 50 is critical for proper illumination. If either the first layer 52*a* or second layer 52*b* of the flag bends into optical cavity 56 and blocks light 60 from reaching another section of the flag layers further away from light source 58 then a darker, shadowed region will appear on the flag surface. One or more cavity shaping elements 88 may be incorporated within optical cavity 56 to keep the layers 52*a* and 52*b* from bending inward, FIGS. 9*a* and 9*d*. Cavity shaping elements 88 should be made of optically transparent material so as to not have the cavity shaping elements cause shadows projected onto the surface of the flag. In one embodiment, cavity shaping elements 88 may be thin springy sheets of clear plastic sewn or otherwise fastened within the optical cavity, FIGS. 9*a* and 9*b*. These sheets of plastic generate a bias that keeps the first layer 52*a* and second layer 52*b* away from each other. In another embodiment, cavity shaping elements 88 are thin filaments of clear plastic connected together in a mesh, FIGS. 9*c* and 9*d*. The mesh can be collapsed during shipping, but expands with a built-in memory bias that allows the thin clear plastic filaments to separate the two layers of the flag when not under a compressive force.

A light dispersing or reflective material may also be applied to the inner surface of the flag to enhance light dispersion within optical cavity 56. This can also work to provide more uniform light distribution across the entire flag surfaces and move some light into regions that might otherwise have shadowing.

Figure 10:
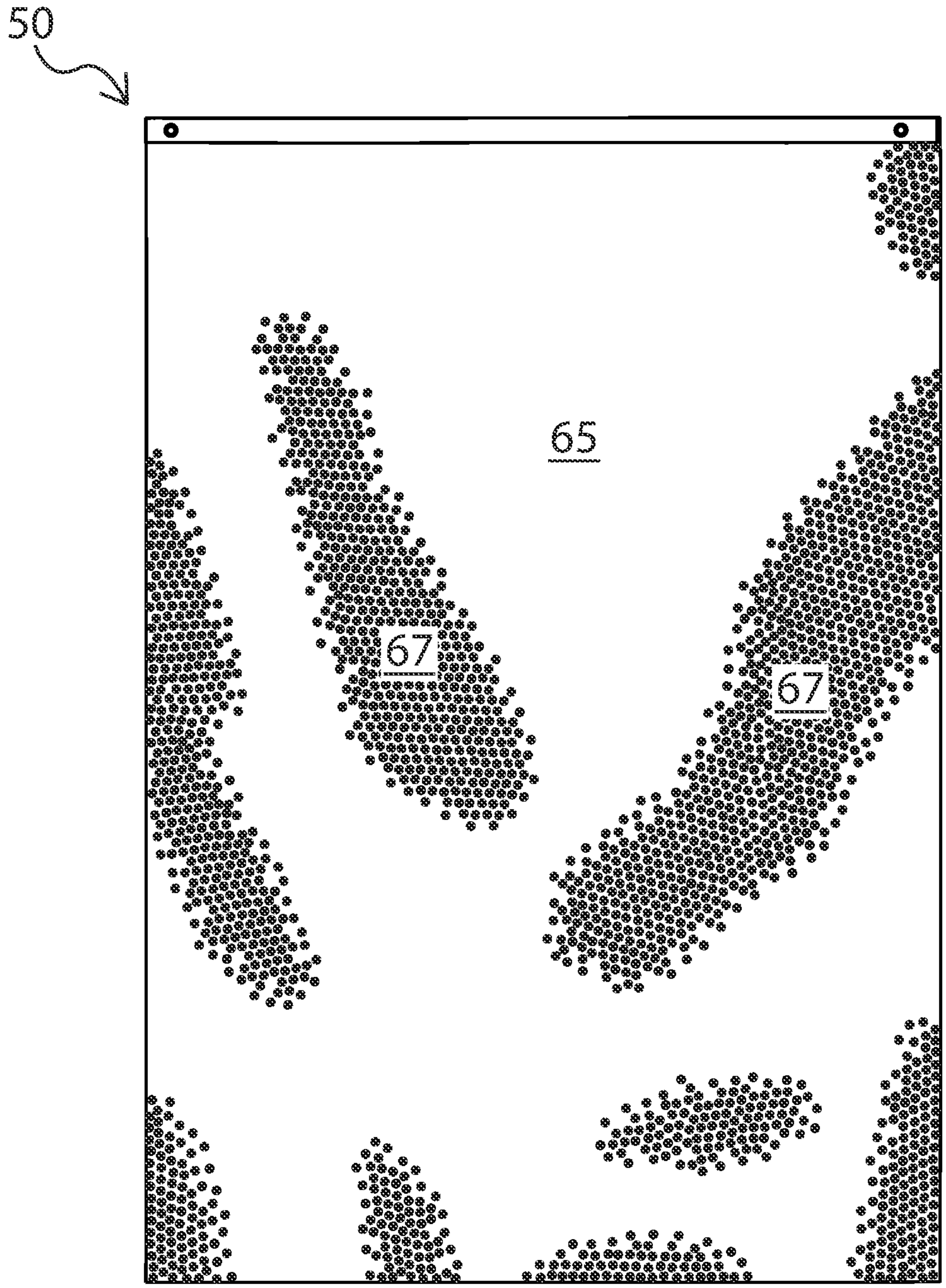
FIG. 10 is a side view of the illuminated flag of FIG. 1 showing shadow texturing an effect that can be generated on the surface of the flag.

Another unique light distribution effect that can be generated to be observable on the outer surface of the flag is shadow texturing, FIG. 10. Shadow texturing is where the light distribution observed on the outer surface of the flag may have local regions that have less light intensity than others (lower light intensity distribution 65 and higher light intensity distribution 67), FIG. 10. Shadow texturing can be used to make the flag have a more rippled or dynamic appearance. In one embodiment this effect is generated from portions of the flag layer bending inward locally and shadowing light from areas of the flag further away from the internal light source. With thin, flexible layers of flag material, wind may cause the layers to move inward and outward creating changing shadows. Cavity shaping 88 elements can also be placed strategically within the flag to help define shadow texture patterns on the flag surface. Shadow texturing can make the flag look more non-static and dynamic in the wind. Shadow texturing can also give the flag a natural flag appearance like a hanging, furled, single layer flag would look like during the day. Materials having shadow patterns could also be provided within the optical cavity to give special shadow texturing effects on the flag.

Figure 11A:
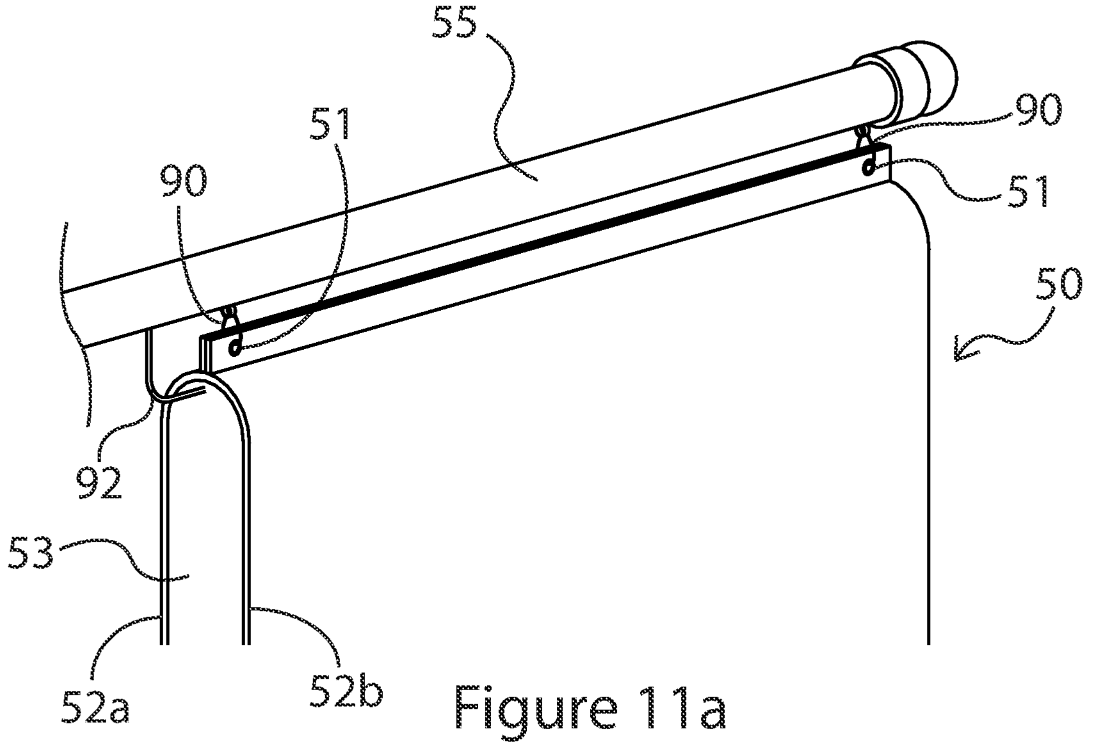
FIG. 11*a* is a perspective view of one embodiment for attaching the illuminated flag of FIG. 1 to a flag pole.
Figure 11B:
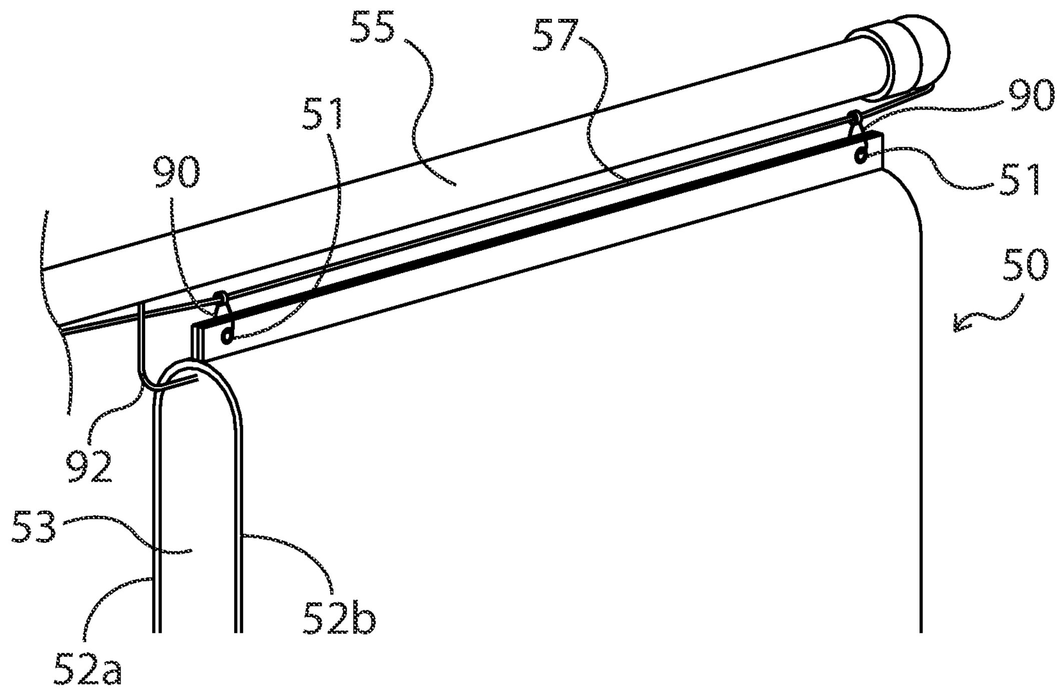
FIG. 11*b* is a perspective view of another embodiment for attaching the illuminated flag of FIG. 1 to a flag pole.

One of the huge benefits of the current invention is that all of the lighting is contained within illuminated flag 50 and no light is lost to the surroundings before illuminating the surface of the flag. The only electrical connection needed is a simple wire for power and in some cases no external connections. Because light source 58 is self-contained within flag 50, the flag can be attached using standard attachment means to standard flag poles 55. FIGS. 11*a* and 11*b* show that flag 50 can be attached to a flag pole using the two standard ways of connecting a flag to a pole. In FIG. 11*a*, flag 50 is attached with flag connectors 90 directly from flag pole 55 to grommet holes 51 on the edge of the flag. In FIG. 11*b*, flag 50 is attached with flag connectors 90 directly from grommet holes 51 on the edge of the flag to cable 57, the cable is then connected to flag pole 55 as standard cables would be attached. Electrical power cable 92 can be directed out of flag 50 to a power source 94 and power controller 96, the electrical power cable can be located either within the flag pole 55 or the electrical power cable can be followed along the pole to a nearby power outlet 93 next to where the flag is being displayed.

Figure 12:
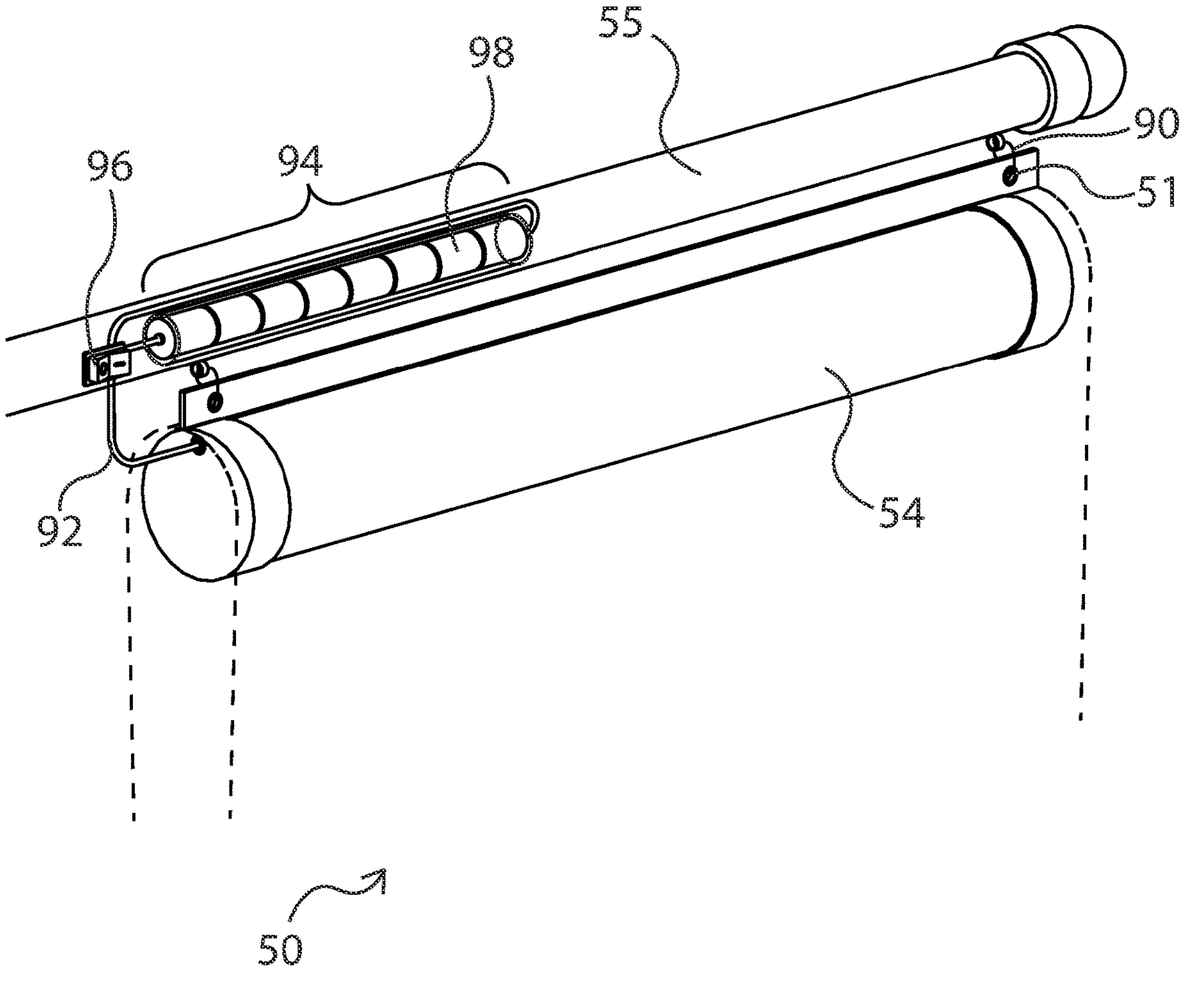
FIG. 12 is a perspective view one embodiment for housing a power source in a flag pole for the illuminated flag of FIG. 1.

In one embodiment, FIG. 12, flag 50 may be integrated with a special flag pole 55*a* that contains power source 94. Flag pole 55*a* may include an electrical power cable connector 92, batteries 98 and an inverter for charging the batteries within the flag pole.

Figure 13A:
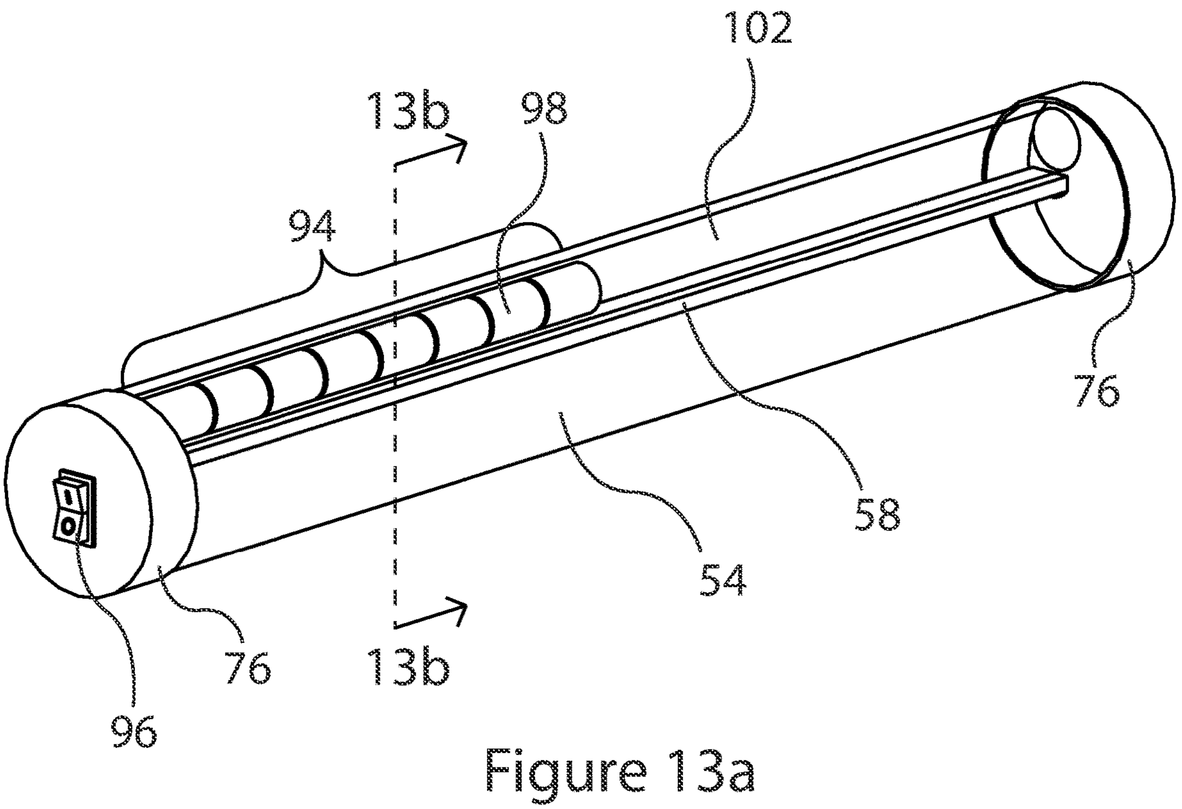
FIG. 13*a* is a perspective view of one embodiment for housing a power source within the optical cavity of the illuminated flag of FIG. 1.
Figure 13B:
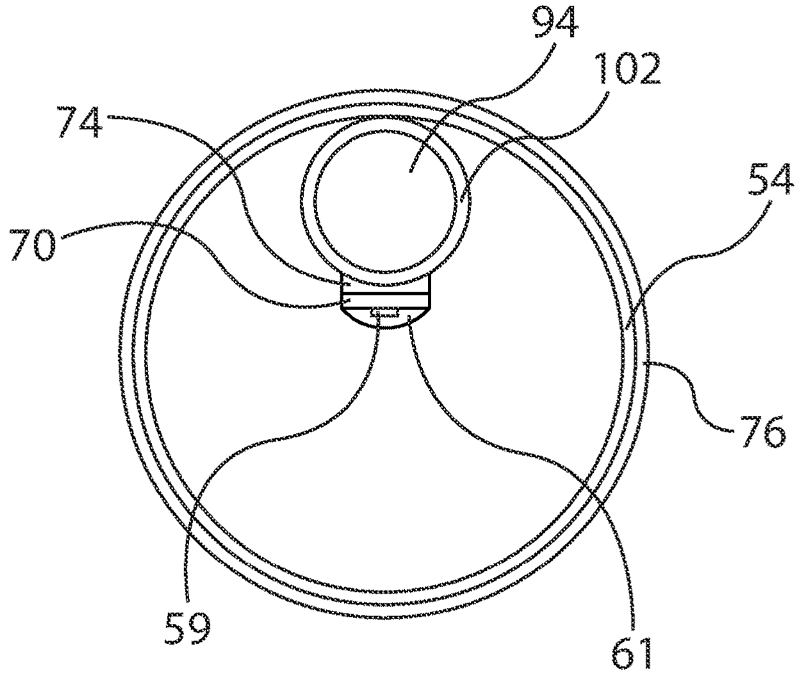
FIG. 13*b* is a sectional view along line 13*b*-13*b* of FIG. 13*a*, showing arrangement of the light source and power source.

In another embodiment, FIGS. 13*a* and 13*b*, power source 94 is contained within flag 50 itself. Here the power sources is a power tube 102 containing batteries and an inverter. Power source 94 may contain an external power switch 96. The power tube is contained with spacer 54. Light source 58 is located on power tube 102.

Flag 50 may be illuminated by integrating flag 50 with a solar recharging system 104. Solar power system 104 may be supported near flag 50 and electrical power cable 92 connected from the solar power system to the flag, FIG. 15*a*. During the day, the power source 94 for the flag is charged. In the evening, an optical sensor actuates the light source and the flag begins to glow.

Figure 15A:
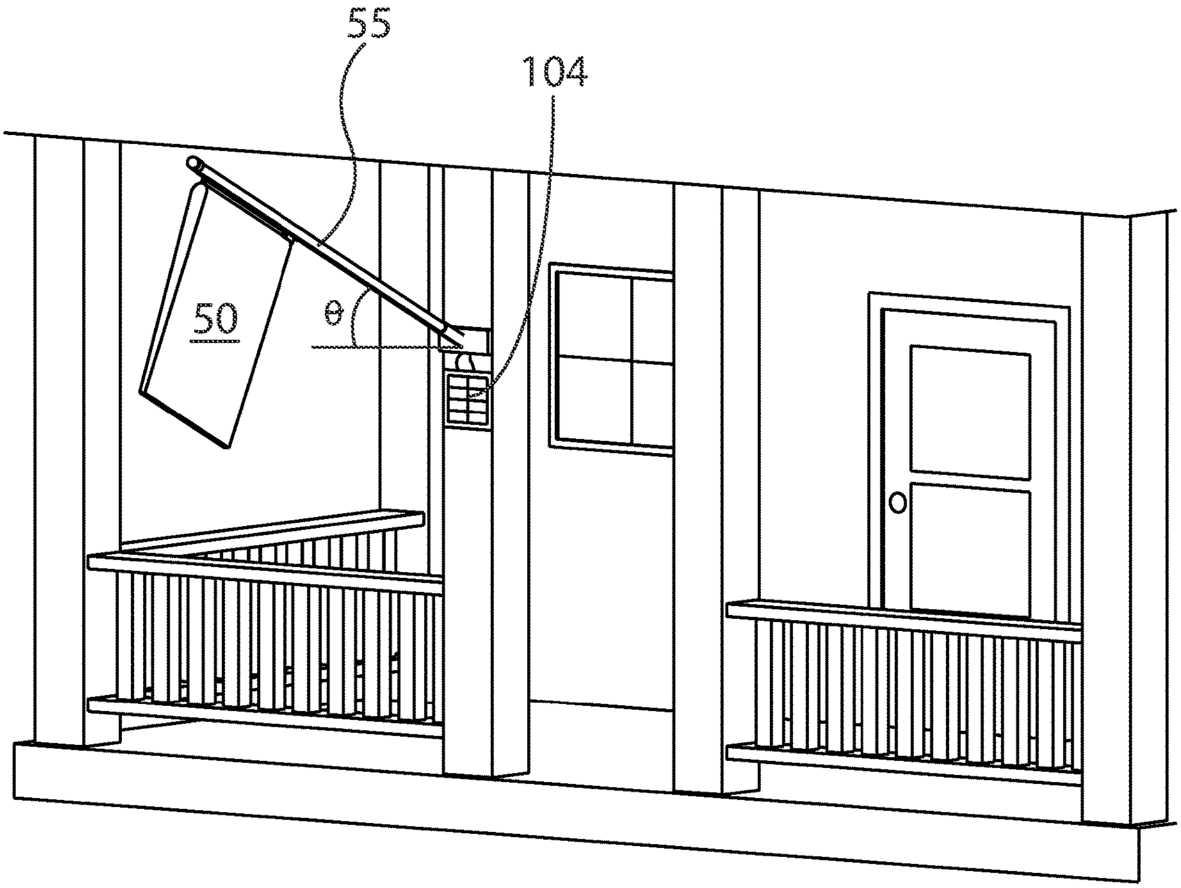
FIG. 15*a* is a schematic showing one embodiment for the placement of the illuminated flag of FIG. 1 on a home.

Illuminated flag 50 can be hung in several in several manners. In FIG. 15*a* flag is hung at an angle θ from the side of a support. It is preferable to have angle be a shallow, horizontal angle so the flag does not collapse upon itself. Generally angles of −45 to +45 degrees work. The available angle range for hanging can be increase by providing flag weights 69 and stiffening elements 71 to keep the flag at shape at larger angles that diverge from horizontal.

Figure 15B:
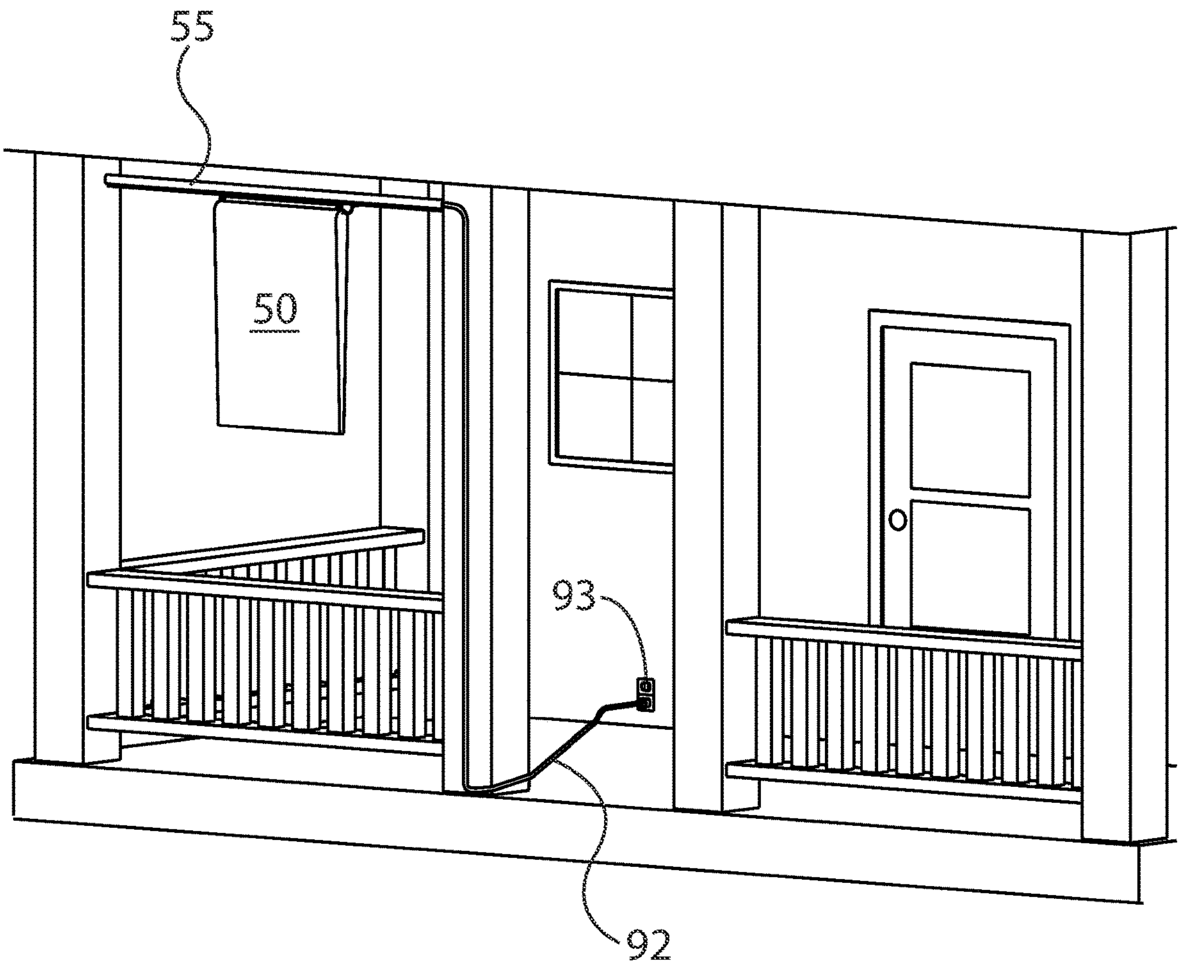
FIG. 15*b* is a schematic showing another embodiment for the placement of the illuminated flag of FIG. 1 on a home.

Another option for hanging flag 50 is to hang the flag substantially horizontally from either the short or long edge of the flag, FIG. 15*b*. Flag 50 may be hung from a rope/cord with fittings or from a horizontal flag pole. Whichever edge the flag is hung from; long dimension or short dimension; that edge preferably becomes the wide portion of the optical cavity and where the spacer and light source is located. Flag 50 may have power cord 92 plug directly into a power source 93.

Figure 16:
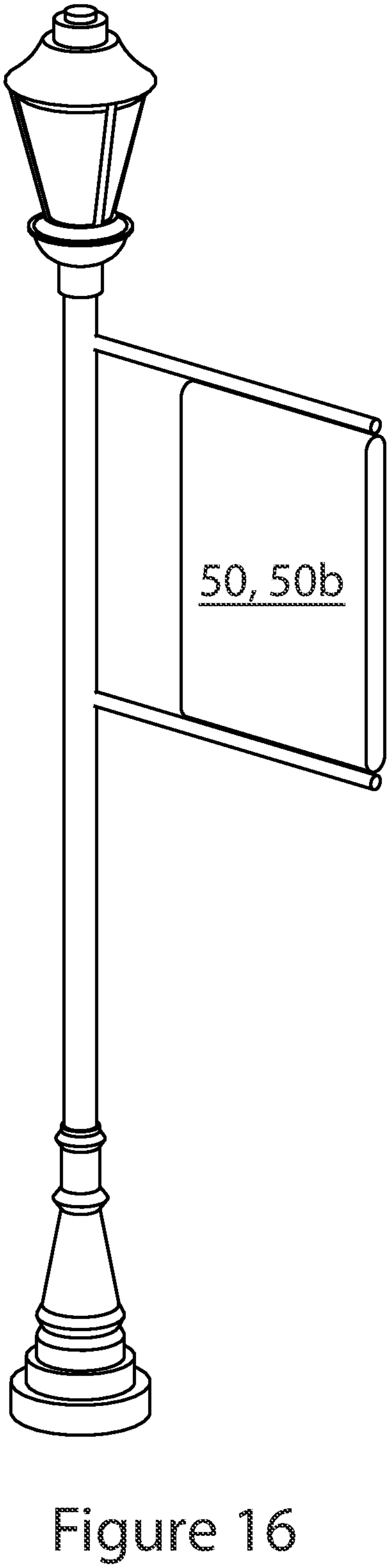
FIG. 16 is perspective view of one embodiment of an illuminated banner in accordance with the present invention.
Figure 17:
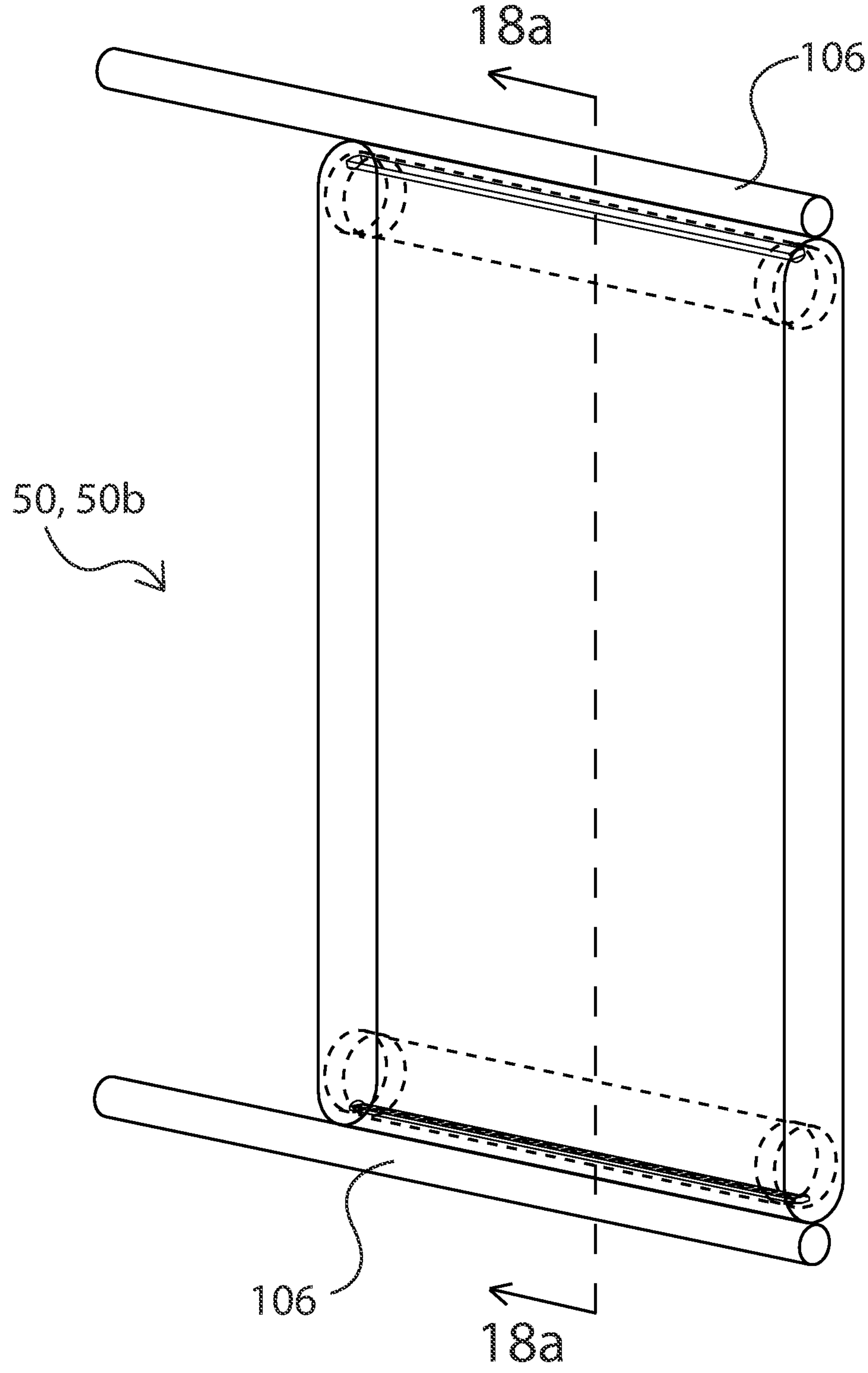
FIG. 17 is a perspective, partially transparent view of the banner in FIG. 16.
Figure 18A:
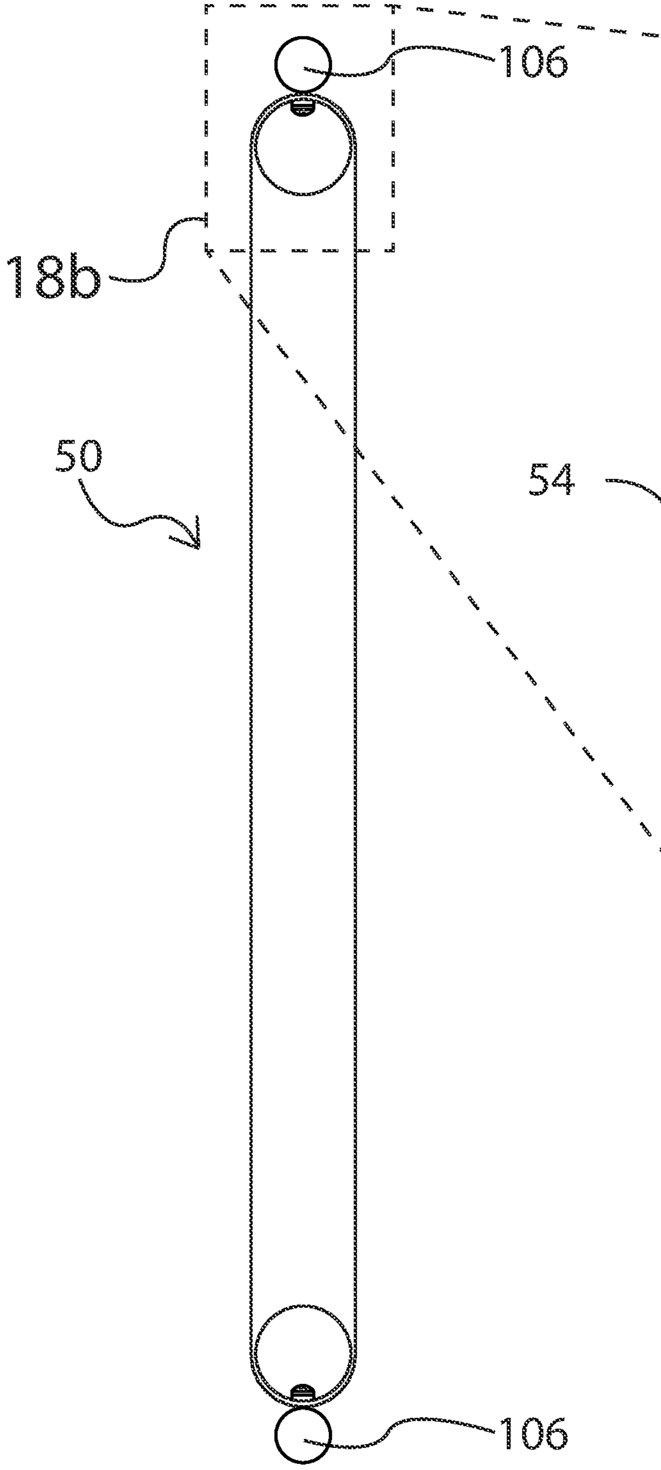
FIG. 18*a* is a sectional view along line 18*a*-18*a* of FIG. 17.
Figure 18B:
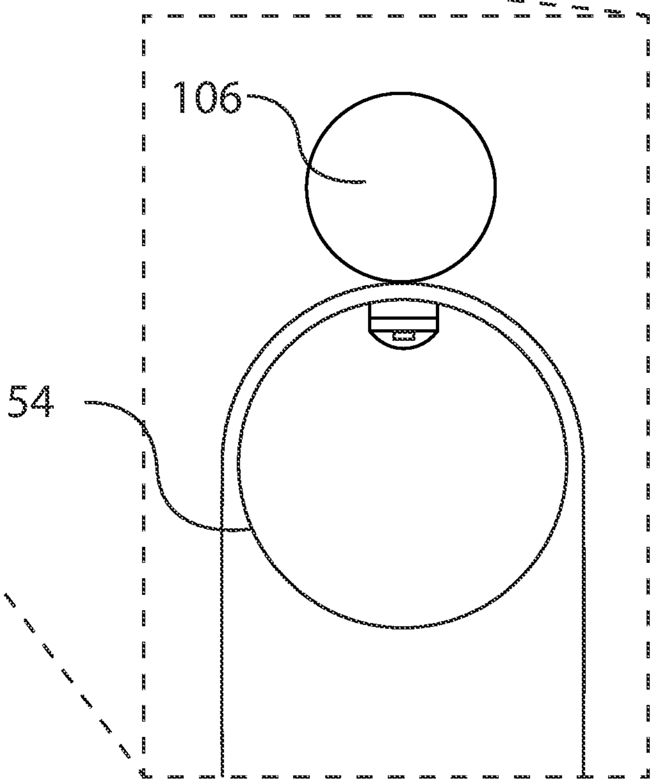
FIG. 18*b* is an enlarged view of the dashed outline in FIG. 18*a;*

In another embodiment, flag 50 may be configured more like a banner 50*a*, supported on two edges by supports 106, FIGS. 16-19*c*. FIG. 16 shows banner 50*a* attached to a lamp post. FIGS. 17 and 18*a*-18*c* show first layer 52*a* and second layer 52*b* of material. Flag 50, 50*a* further comprises a first spacer 54*a* and a second spacer 54*b* located at distal ends or edges of the flag. Light source 58 is contained within one or both of spacers 54*a* and 54*b*. First spacer 54*a* and second spacer 54*b* are separated to support the first layer of flag and second layer of flag to create an optical cavity. Light sources 58*a* and 58*b* are located within optical cavity 56 to illuminate the first layer 52*a* and second layer 52*b* of the flag from within the cavity. Flag 50 may further comprise a light distribution element 80 to adjust the illumination to be more uniform as described above. This structure may also be used as a freely flowing illuminated flag 50 where the bottom support for the flag does not exist and the top support is a flag pole or other support.

Figure 19A:
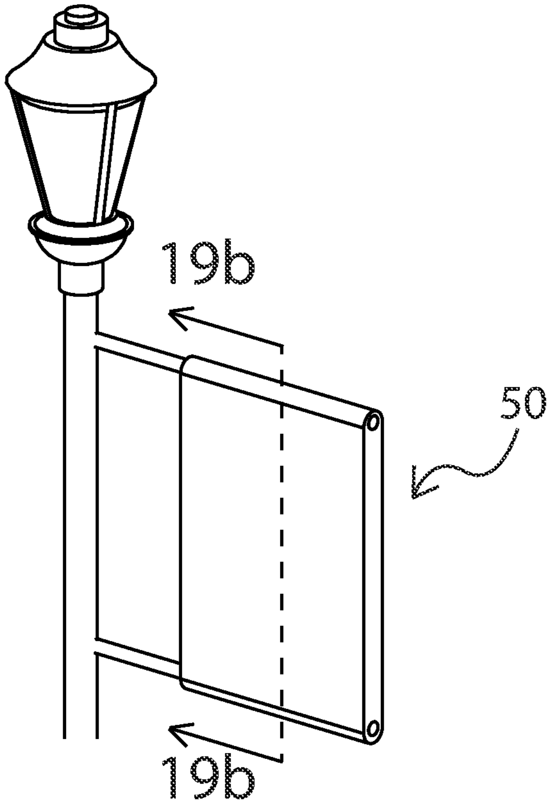
FIG. 19*a* is perspective view of one embodiment of an illuminated banner in accordance with the present invention.
Figure 19C:
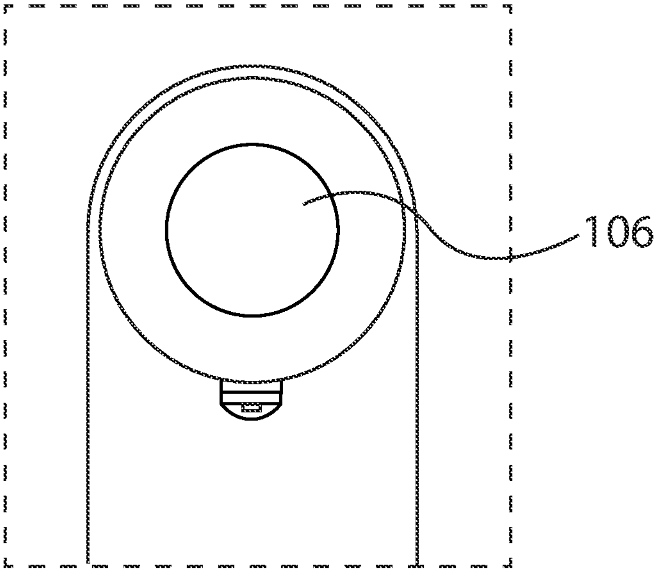
FIG. 19*c* is an enlarged view of the dashed outline in FIG. 19*b;*
Figure 19B:
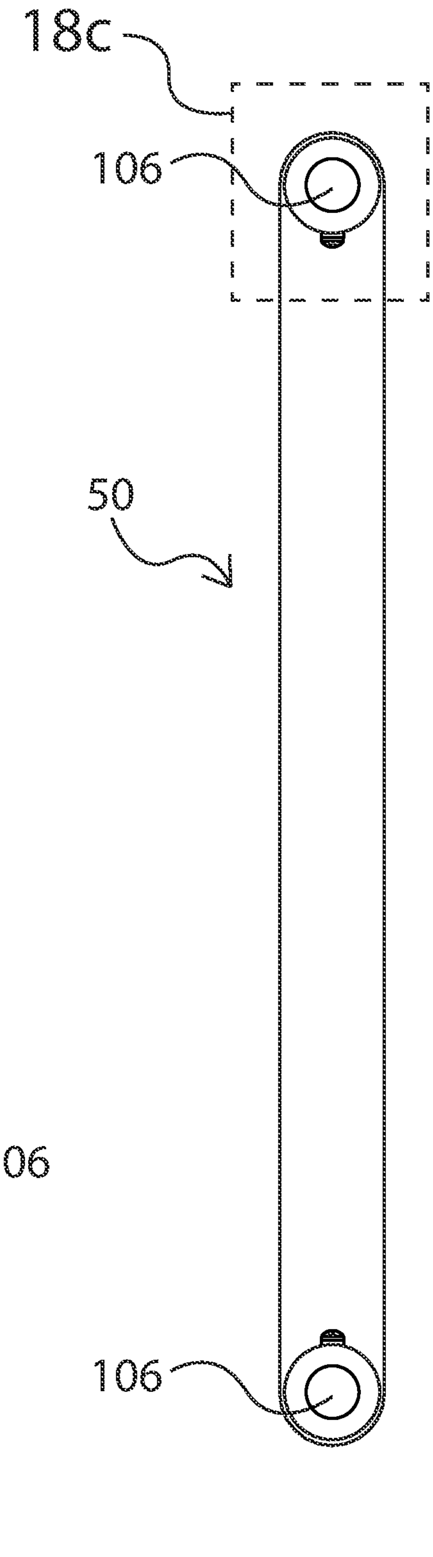
FIG. 19*b* is a sectional view along line 19*b*-19*b* of FIG. 19*a;*
Figure 20:
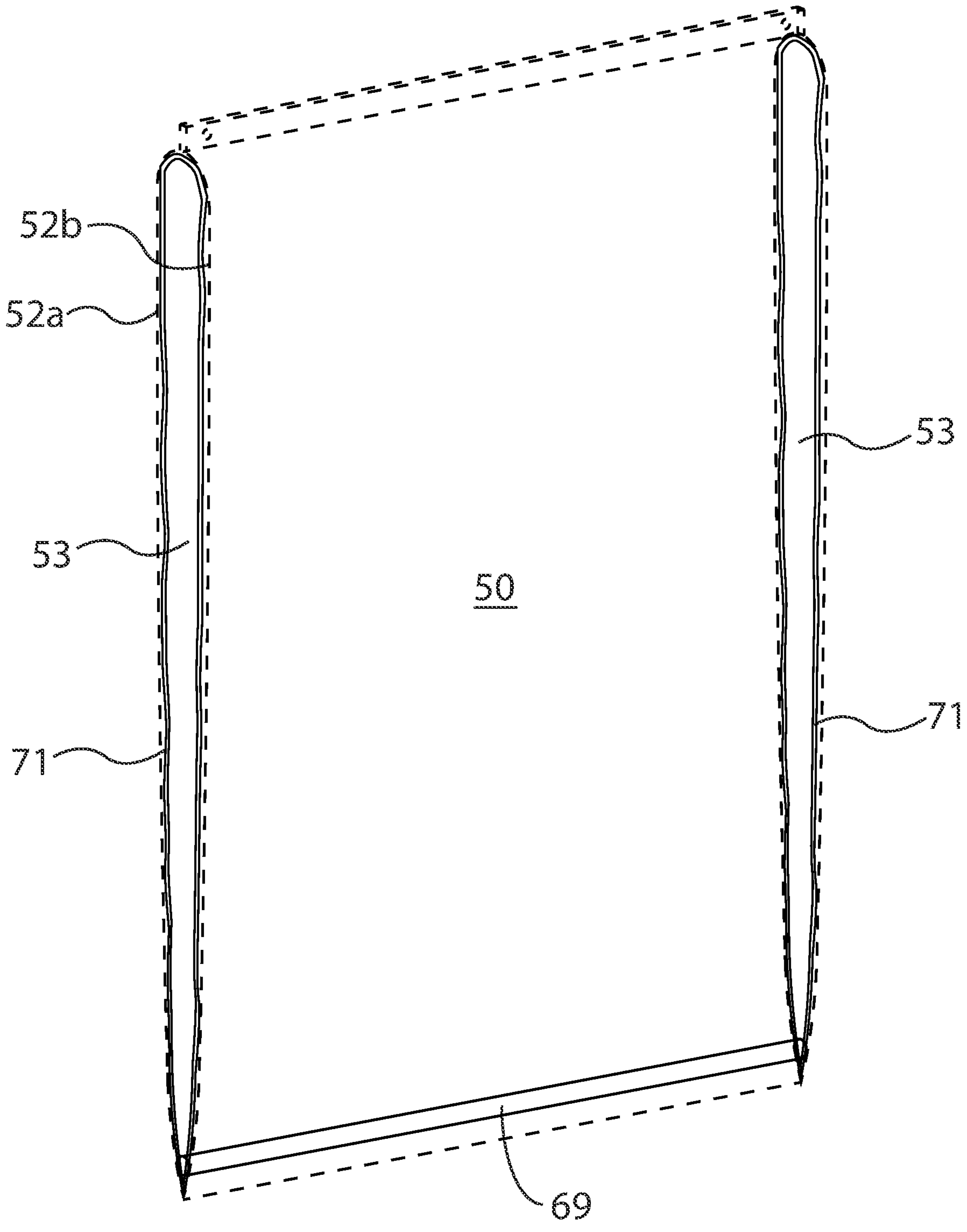
FIG. 20 is transparent view of the illuminated flag in FIG. 1 showing how weights and stiffening elements may be added to the flag to change properties of the flag.
Figure 21A:
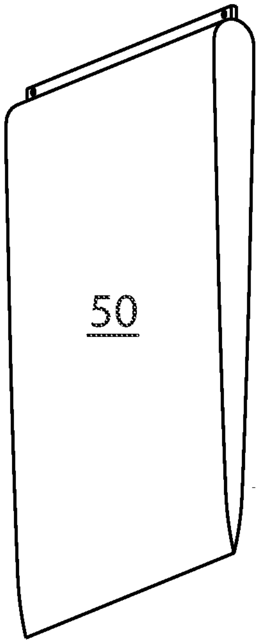
FIG. 21*a* is a perspective view for one design shape of the illuminated flag in FIG. 1.
Figure 21B:
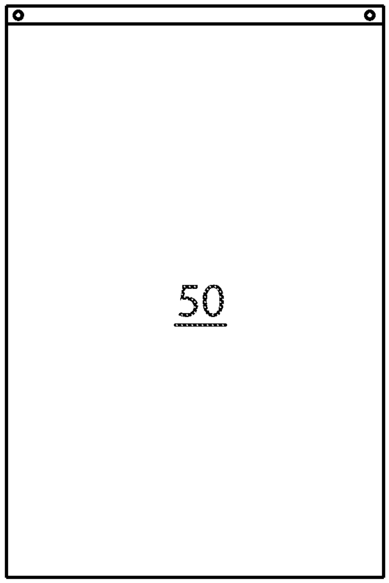
FIG. 21*b* is a front and back view of the illuminated flag in FIG. 21*a;*
Figure 21C:
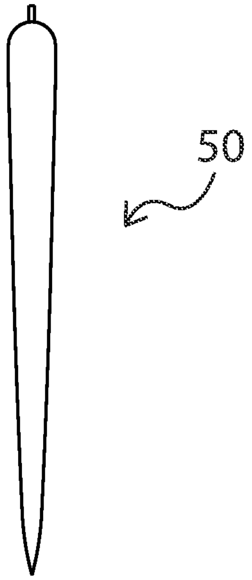
FIG. 21*c* is right and left side view of the illuminated flag in FIG. 21*a;*
Figure 21D:
FIG. 21*d* is top view of the illuminated flag in FIG. 21*a;*
Figure 21E:
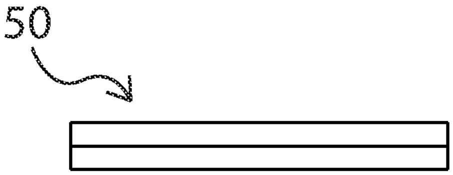
FIG. 21*e* is bottom view of the illuminated flag in FIG. 21*a;*
Figure 22A:
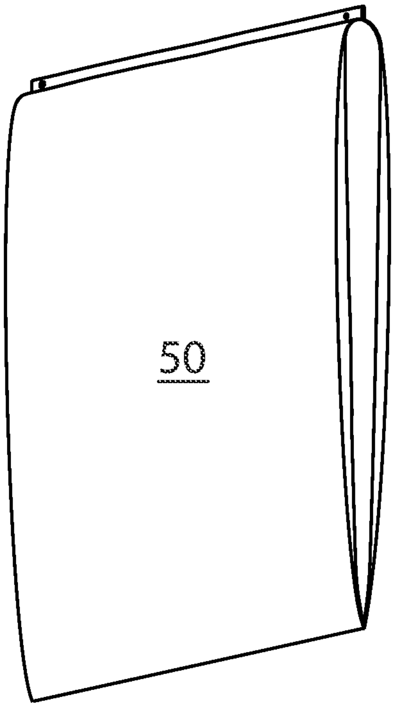
FIG. 22*a* is a perspective view for one design shape of the illuminated flag in FIG. 1.
Figure 22B:
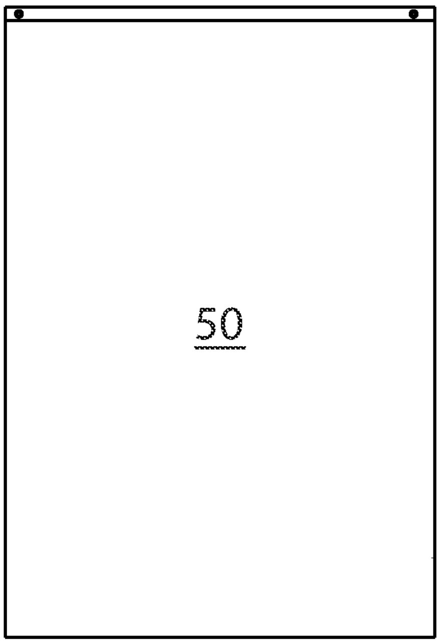
FIG. 22*b* is a front and back view of the illuminated flag in FIG. 22*a;*
Figure 22C:
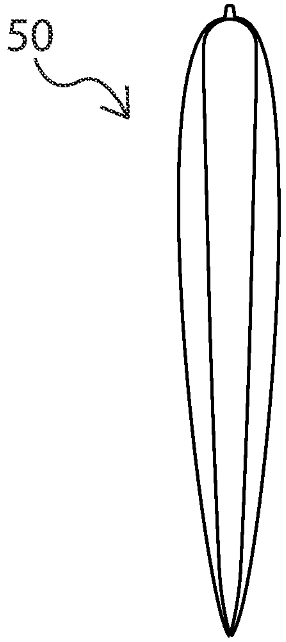
FIG. 22*c* is right and left side view of the illuminated flag in FIG. 22*a;*
Figure 22D:
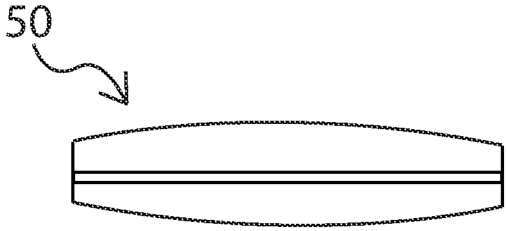
FIG. 22*d* is top view of the illuminated flag in FIG. 22*a;*
Figure 22E:
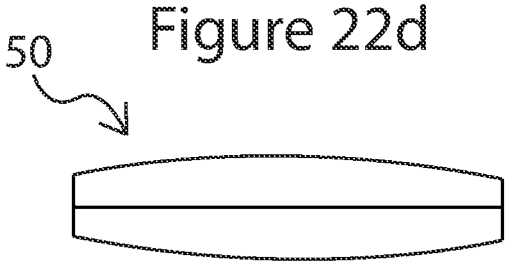
FIG. 22*e* is bottom view of the illuminated flag in FIG. 22*a;*
Figure 23A:
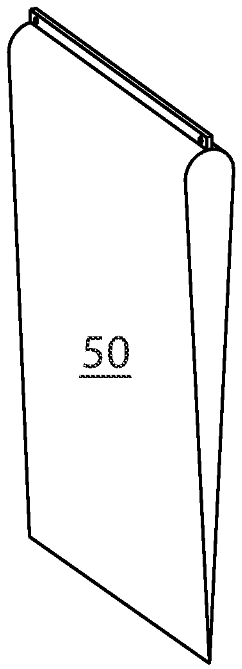
FIG. 23*a* is a perspective view for one design shape of the illuminated flag in FIG. 1.
Figure 23B:
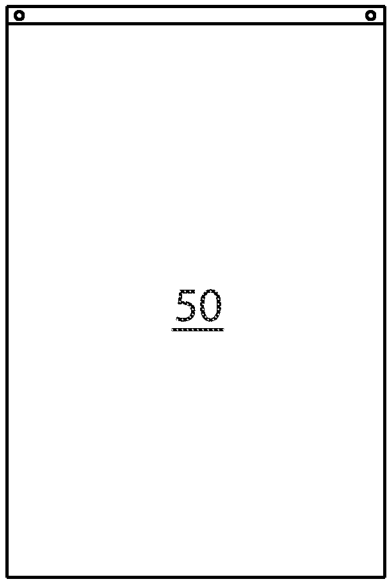
FIG. 23*b* is a front and back view of the illuminated flag in FIG. 23*a;*
Figure 23C:
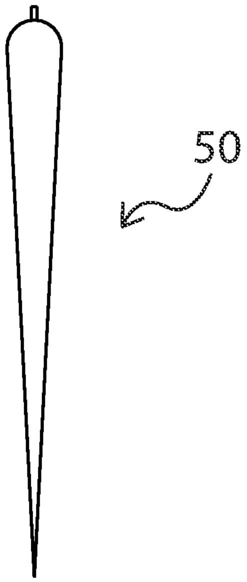
FIG. 23*c* is right and left side view of the illuminated flag in FIG. 23*a;*
Figure 23D:
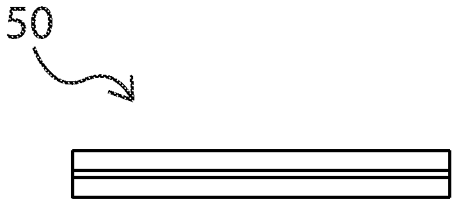
FIG. 23*d* is top view of the illuminated flag in FIG. 23*a;*
Figure 23E:
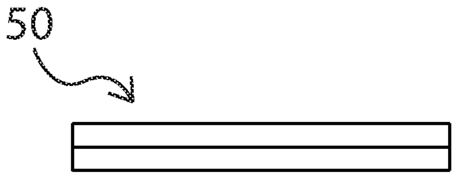
FIG. 23*e* is bottom view of the illuminated flag in FIG. 23*a;*
Figure 24A:
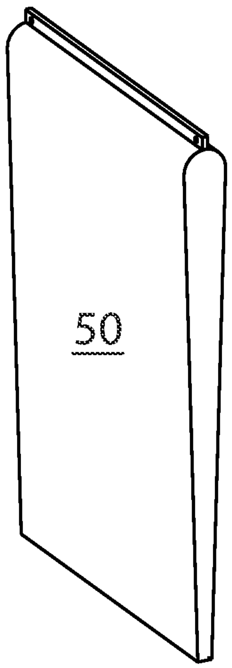
FIG. 24*a* is a perspective view for one design shape of the illuminated flag in FIG. 1.
Figure 24B:
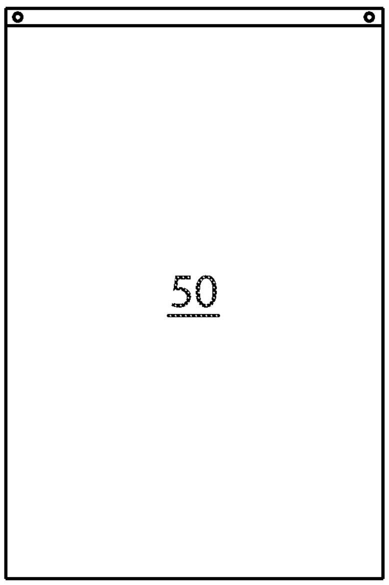
FIG. 24*b* is a front and back view of the illuminated flag in FIG. 24*a;*
Figure 24C:
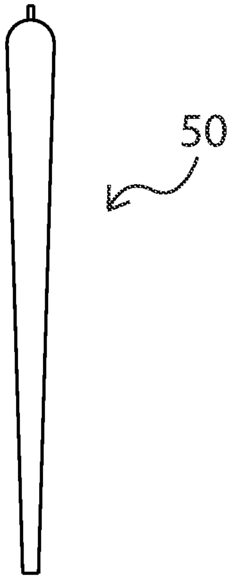
FIG. 24*c* is right and left side view of the illuminated flag in FIG. 24*a;*
Figure 24D:
FIG. 24*d* is top view of the illuminated flag in FIG. 24*a;*
Figure 24E:
FIG. 24*e* is bottom view of the illuminated flag in FIG. 24*a;*
Figure 25A:
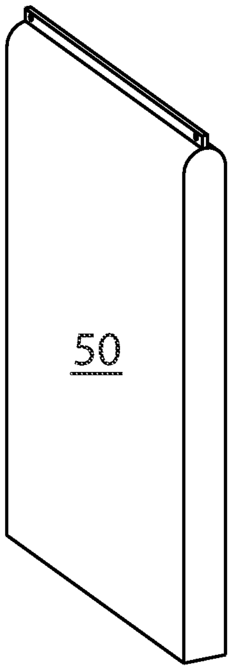
FIG. 25*a* is a perspective view for one design shape of the illuminated flag in FIG. 1.
Figure 25B:
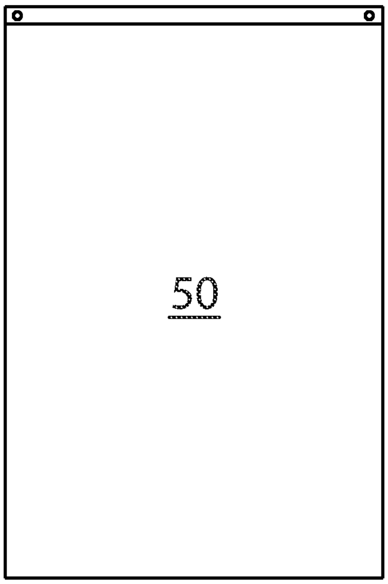
FIG. 25*b* is a front and back view of the illuminated flag in FIG. 25*a;*
Figure 25C:
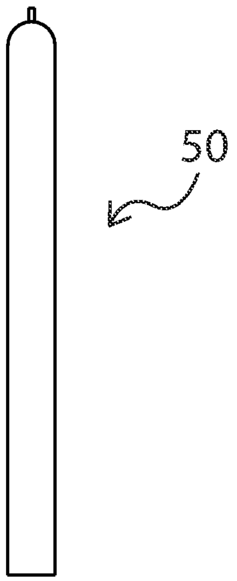
FIG. 25*c* is right and left side view of the illuminated flag in FIG. 25*a;*
Figure 25D:
FIG. 25*d* is top view of the illuminated flag in FIG. 25*a;*
Figure 25E:
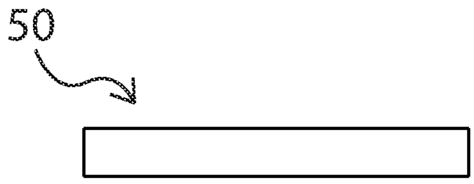
FIG. 25*e* is bottom view of the illuminated flag in FIG. 25*a;*
Figure 26A:
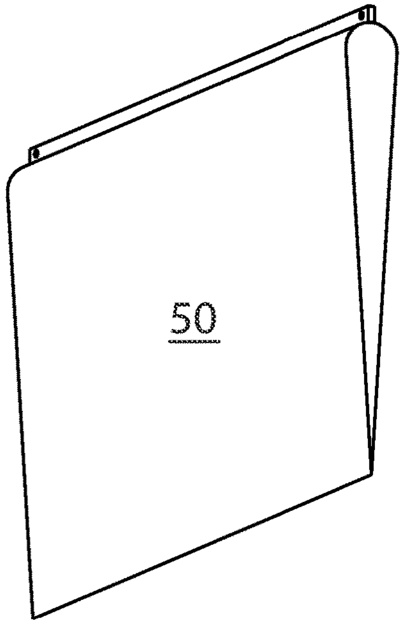
FIG. 26*a* is a perspective view for one design shape of the illuminated flag in FIG. 1.
Figure 26B:
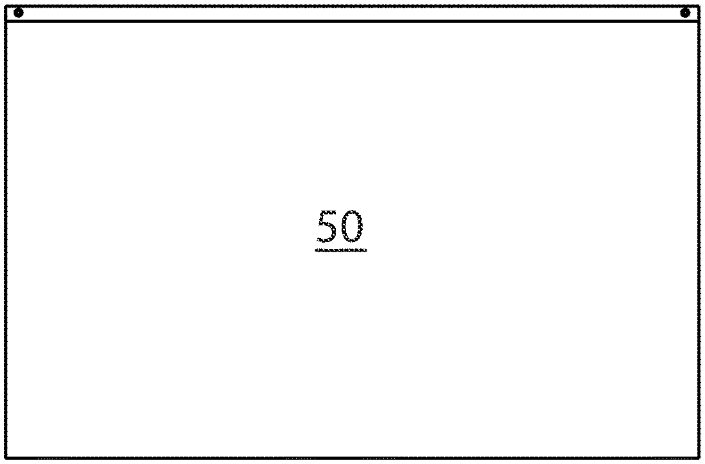
FIG. 26*b* is a front and back view of the illuminated flag in FIG. 26*a;*
Figure 26C:
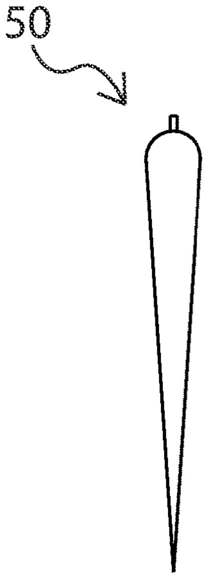
FIG. 26*c* is right and left side view of the illuminated flag in FIG. 26*a;*
Figure 26D:
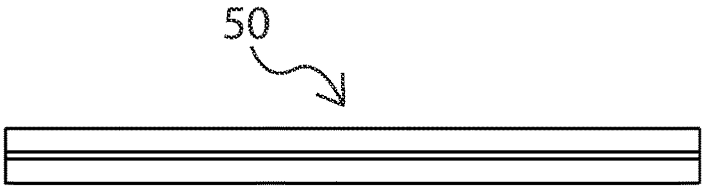
FIG. 26*e* is bottom view of the illuminated flag in FIG. 26*a;*
Figure 26E:
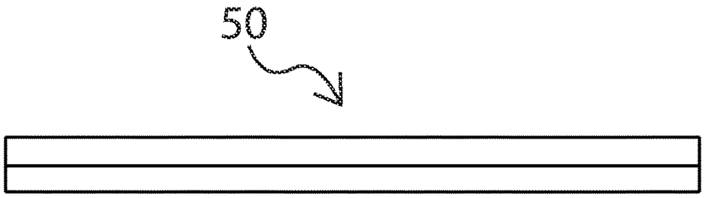
Figure 27A:
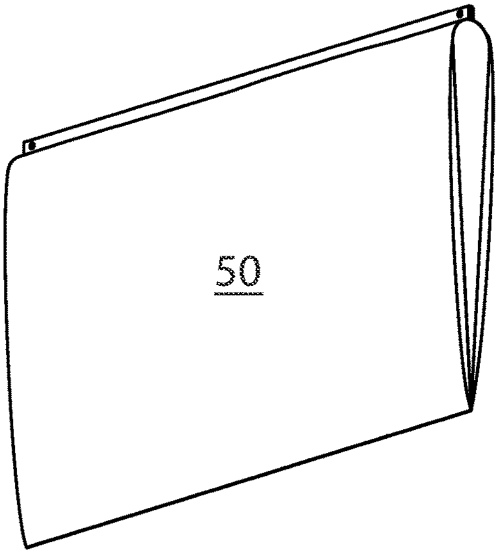
FIG. 27*a* is a perspective view for one design shape of the illuminated flag in FIG. 1.
Figure 27B:
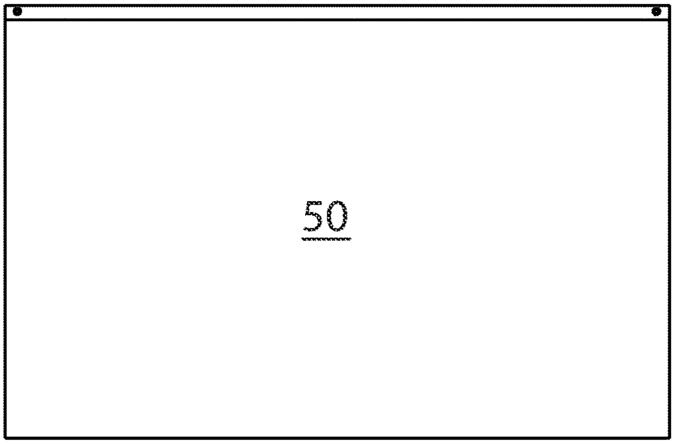
FIG. 27*b* is a front and back view of the illuminated flag in FIG. 27*a;*
Figure 27C:
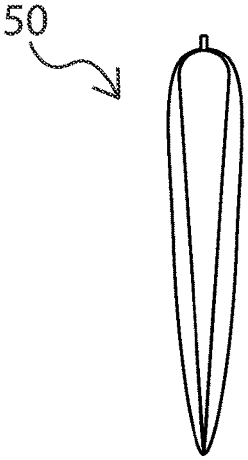
FIG. 27*c* is right and left side view of the illuminated flag in FIG. 27*a;*
Figure 27D:
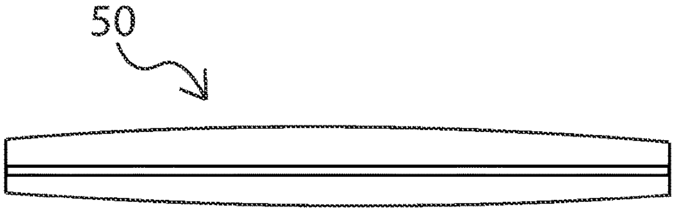
FIG. 27*d* is top view of the illuminated flag in FIG. 27*a;*
Figure 27E:
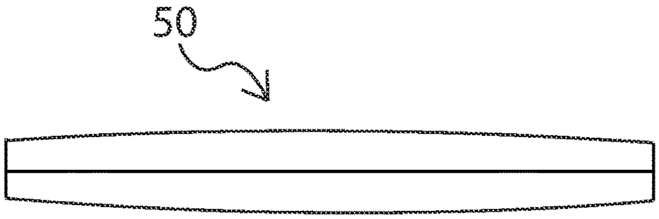
FIG. 27*e* is bottom view of the illuminated flag in FIG. 27*a;*
Figure 28A:
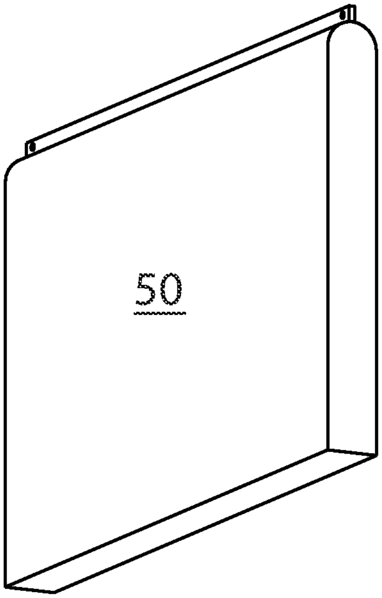
FIG. 28*a* is a perspective view for one design shape of the illuminated flag in FIG. 1.
Figure 28B:
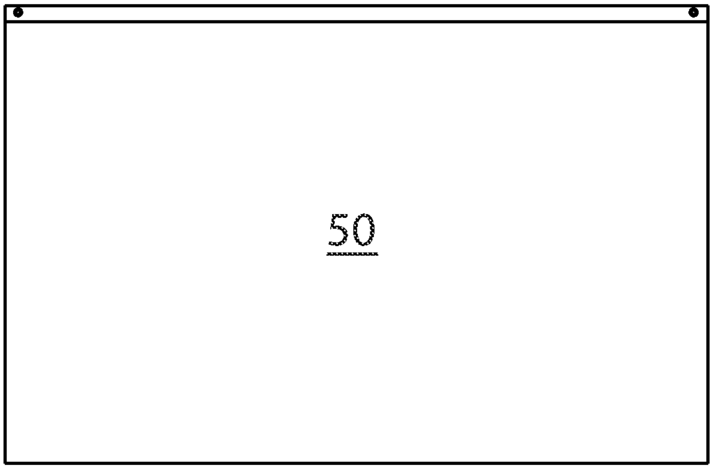
FIG. 28*b* is a front and back view of the illuminated flag in FIG. 28*a;*
Figure 28C:
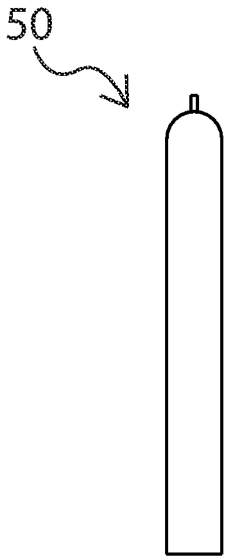
FIG. 28*c* is right and left side view of the illuminated flag in FIG. 28*a;*
Figure 28D:
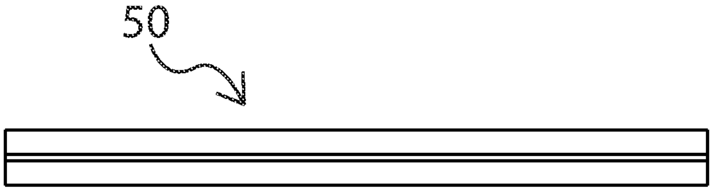
FIG. 28*d* is top view of the illuminated flag in FIG. 28*a;*
Figure 28E:
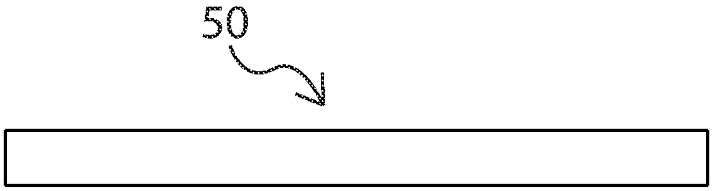
FIG. 28*e* is bottom view of the illuminated flag in FIG. 28*a;*
Figure 29A:
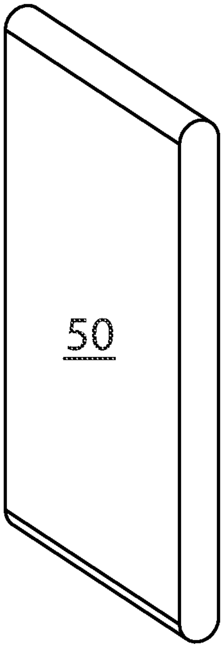
FIG. 29*a* is a perspective view for one design shape of the illuminated flag in FIG. 1.
Figure 29B:
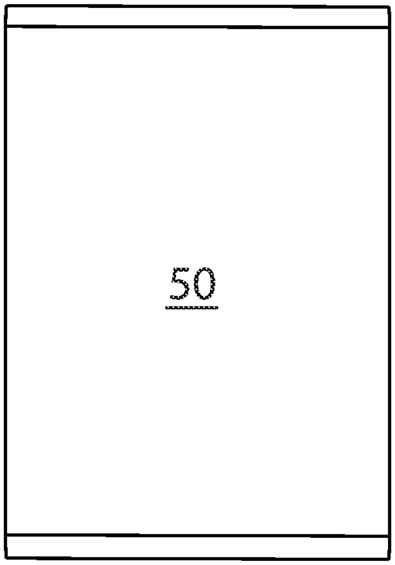
FIG. 29*b* is a front and back view of the illuminated flag in FIG. 29*a;*
Figure 29C:
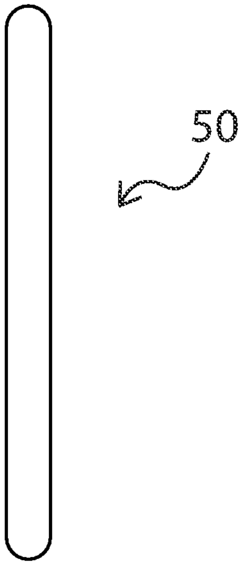
FIG. 29*c* is right and left side view of the illuminated flag in FIG. 29*a;*
Figure 29D:
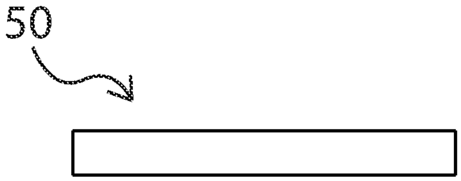
FIG. 29*d* is top view of the illuminated flag in FIG. 29*a;*
Figure 29E:
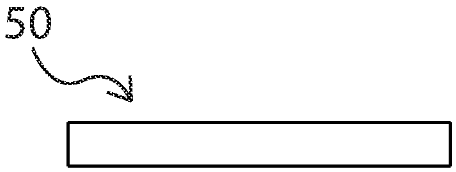
FIG. 29*e* is bottom view of the illuminated flag in FIG. 29*a;*
Figure 30A:
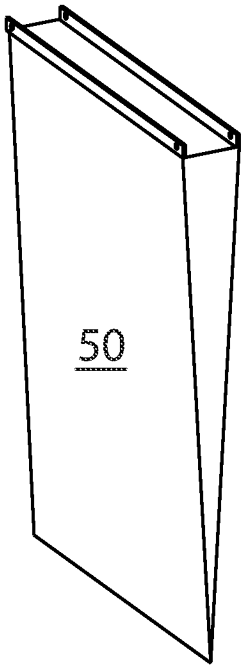
FIG. 30*a* is a perspective view for one design shape of the illuminated flag in FIG. 1.
Figure 30B:
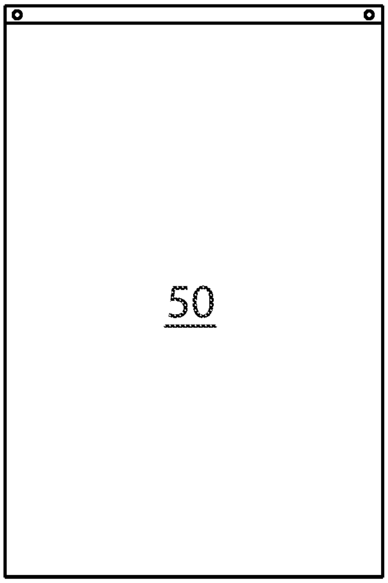
FIG. 30*b* is a front and back view of the illuminated flag in FIG. 30*a;*
Figure 30C:
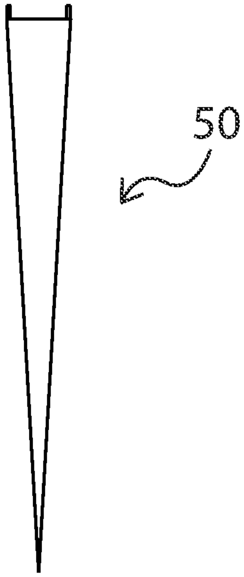
FIG. 30*c* is right and left side view of the illuminated flag in FIG. 30*a;*
Figure 30D:
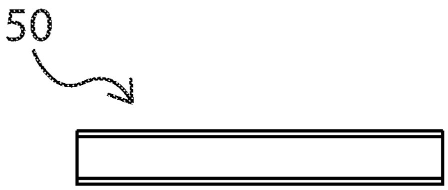
FIG. 30*d* is top view of the illuminated flag in FIG. 30*a;*
Figure 30E:
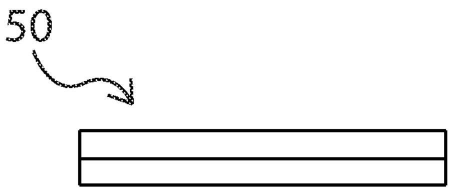
FIG. 30*e* is bottom view of the illuminated flag in FIG. 30*a;*
Figure 31A:
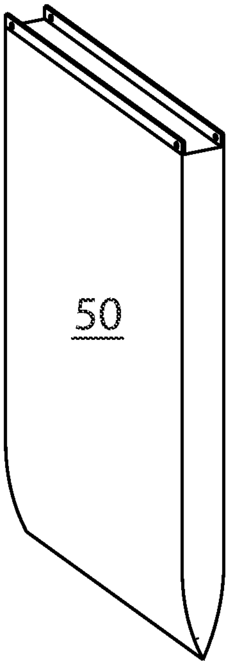
FIG. 31*a* is a perspective view for one design shape of the illuminated flag in FIG. 1.
Figure 31B:
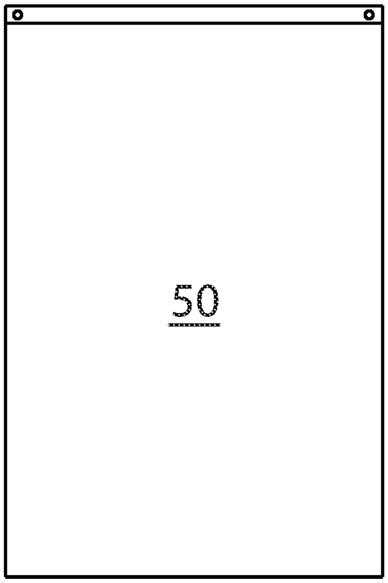
FIG. 31*b* is a front and back view of the illuminated flag in FIG. 31*a;*
Figure 31C:
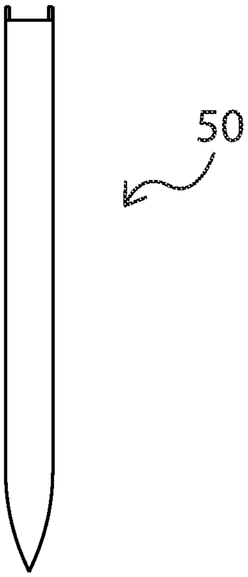
FIG. 31*c* is right and left side view of the illuminated flag in FIG. 31*a;*
Figure 31D:
FIG. 31*d* is top view of the illuminated flag in FIG. 31*a;*
Figure 31E:
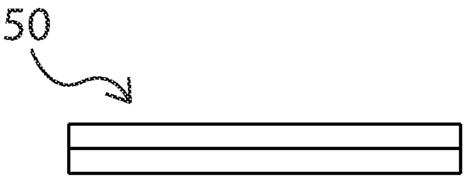
FIG. 31*e* is bottom view of the illuminated flag in FIG. 31*a;*
Figure 32A:
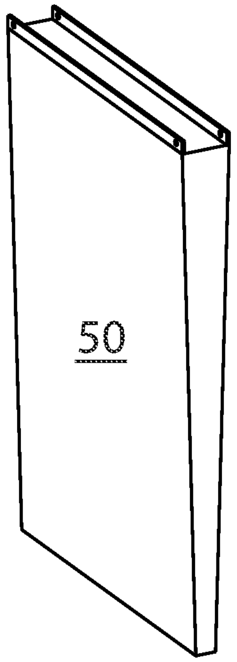
FIG. 32*a* is a perspective view for one design shape of the illuminated flag in FIG. 1.
Figure 32B:
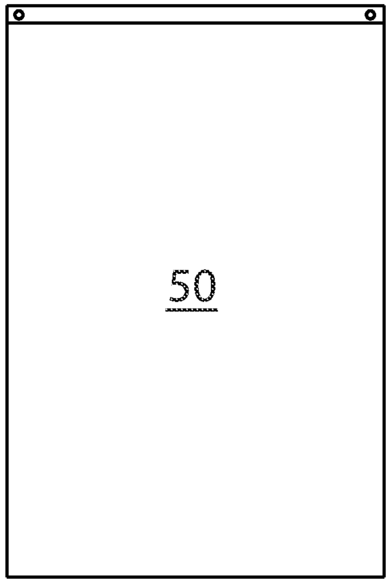
FIG. 32*b* is a front and back view of the illuminated flag in FIG. 32*a;*
Figure 32C:
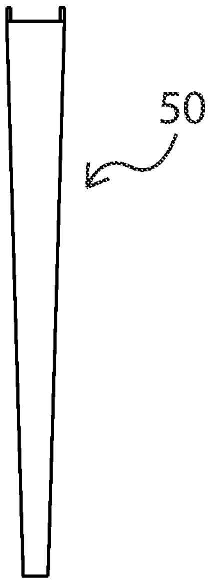
FIG. 32*c* is right and left side view of the illuminated flag in FIG. 32*a;*
Figure 32D:
FIG. 32*d* is top view of the illuminated flag in FIG. 32*a;*
Figure 32E:
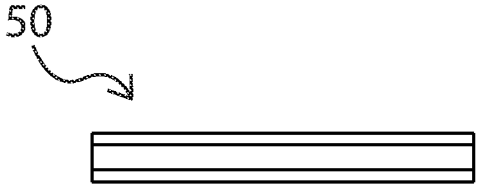
FIG. 32*e* is bottom view of the illuminated flag in FIG. 32*a;*
Figure 33A:
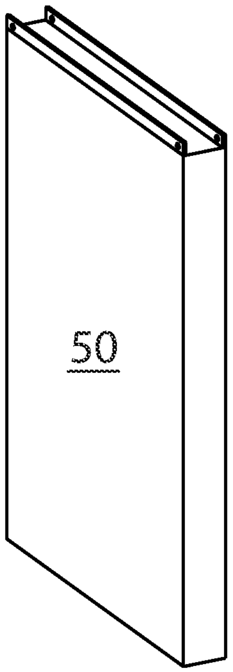
FIG. 33*a* is a perspective view for one design shape of the illuminated flag in FIG. 1.
Figure 33B:
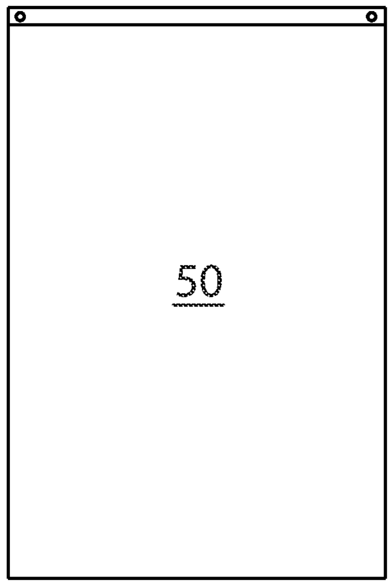
FIG. 33*b* is a front and back view of the illuminated flag in FIG. 33*a;*
Figure 33C:
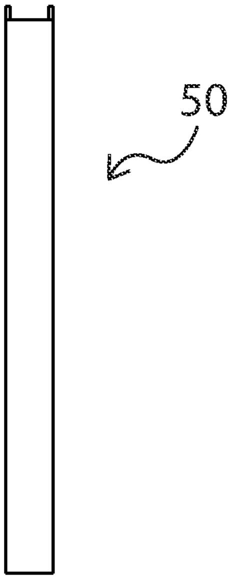
FIG. 33*c* is right and left side view of the illuminated flag in FIG. 33*a;*
Figure 33D:
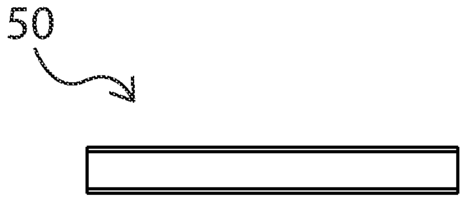
FIG. 33*d* is top view of the illuminated flag in FIG. 33*a;*
Figure 33E:
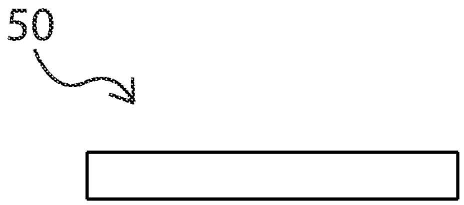
FIG. 33*e* is bottom view of the illuminated flag in FIG. 33*a;*

FIGS. 19*a*-*c* show another embodiment where spacers 54*a* and 54*b* are also the supports 106 for banner 50*a*. In this embodiment, light source 58 is located outside of spacers 54*a* and 54*b*. Additional light distribution elements 80 may or may not be integrated with light source 58.

Flag 50 may also include flag weights, weights 69 distributed within the flag enhance the ability of the flag to retain its shape when hung at an angle. Flag 50 may also have one or more stiffening elements 71 to support optical cavity 56 from collapsing when the flag is held at more horizontal angles.

The exact shape of flag 50 can take on several options as seen in FIGS. 21*a*-33*e*. FIGS. 21*a*-*e* show a substantially wedge-shaped, rectangular flag. The wedge can narrow from short edge to short edge (shown) or from long edge to long edge, FIGS. 26*a*-27*e*. In FIGS. 21*a*-*e*, slight angular variations may be imparted to the optical cavity from a straight line wedge without deviating from the scope of the invention. In FIGS. 22*a*-22*e*, additional changes to the wedge shape may occur where the sides bend outward to create a more convex shape to the layers. This shaping is a result of the type and placement of shaping elements 88 and this effect can be applied to all flag designs in this disclosure providing a more convex shape to all flags. FIGS. 23*a*-23*e* show a straight line wedge-shaped, rectangular flag. FIGS. 24*a*-*e* show a wedge-shaped flag with an additional side layer at the narrow edge of the wedge. FIGS. 25*a*-*e* show a rectangular cuboid flag with a curved edge and an additional side layer. FIGS. 26*a*-28*e* show versions of the flag being hung from the long edge of the flag in a substantially horizontal manner. FIGS. 29*a*-*e* show a rectangular cuboid flag with two curved edges. FIGS. 30*a*-*e* show a wedge-shaped rectangular flag with extension for connecting the flag to a flag pole. FIGS. 31*a*-*e* show a rectangular cuboid flag with connector extensions on one edge and an angled opposite edge. FIGS. 32*a*-*e* show a wedge-shaped rectangular flag with connection extensions on one edge and an opposite side layer. FIGS. 33*a*-*e* show a rectangular cuboid with connection extensions.

Figure 34:
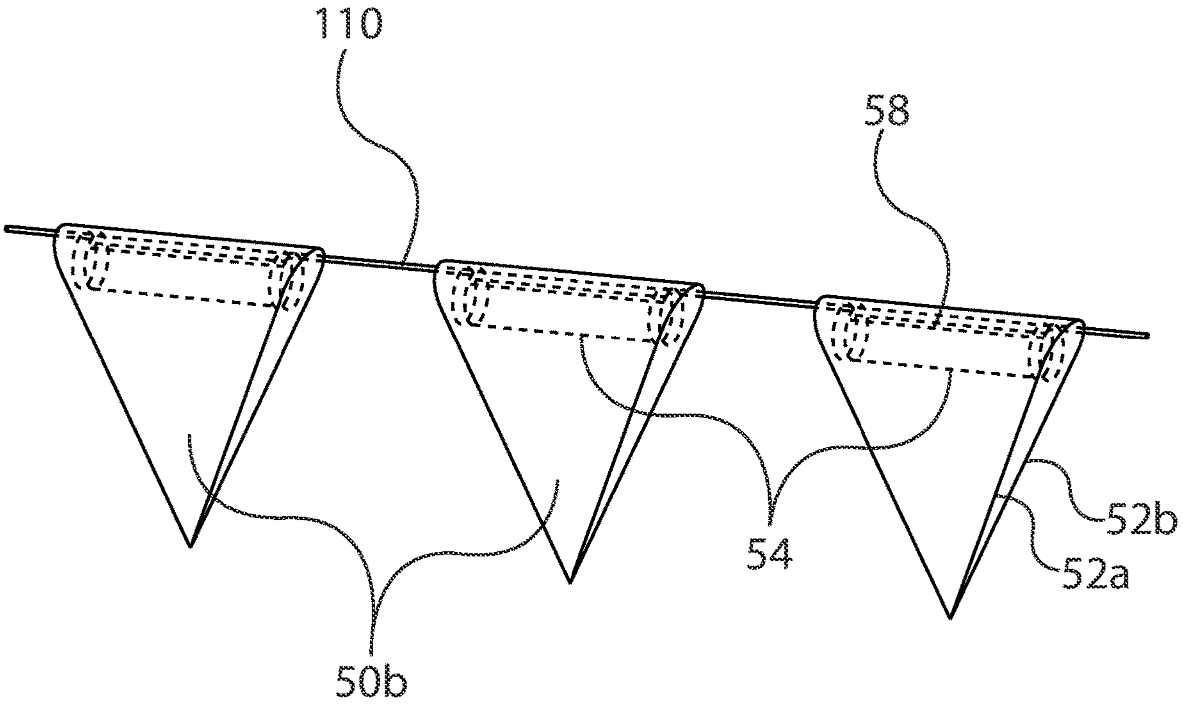
FIG. 34 is a perspective view for one structure for linking a plurality of illuminated flags as in FIG. 1 together to make a strip banner, the shape of the flag modified to triangular.
Figure 35:
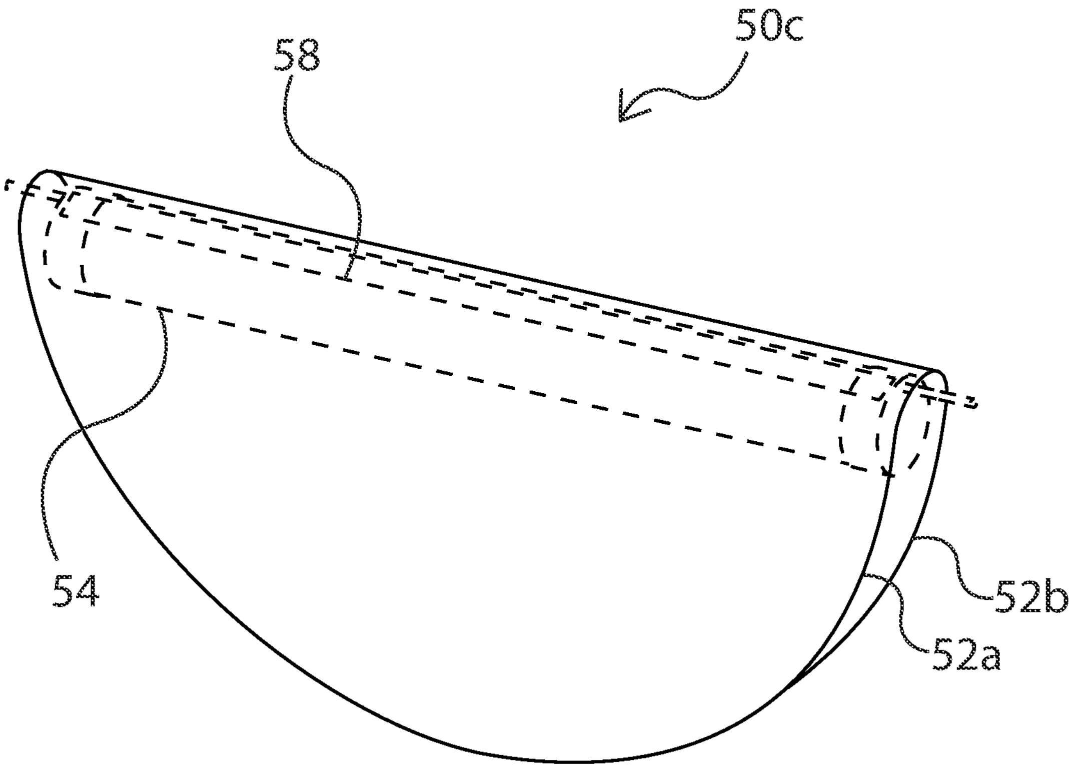
FIG. 35 is a perspective view for an alternative shape of the illuminated flag in FIG. 1.
Figure 36A:
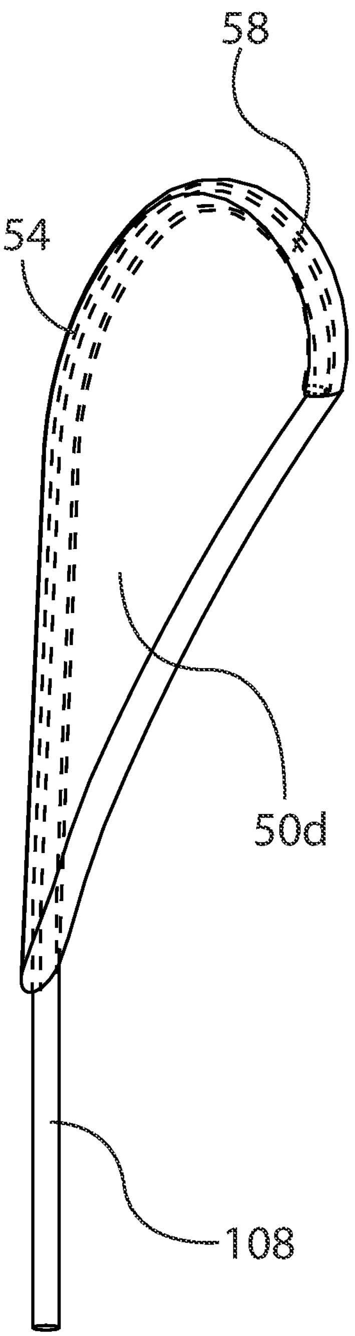
FIG. 36*a* is a front perspective view of one embodiment of an illuminated banner in accordance with the present invention.
Figure 36B:
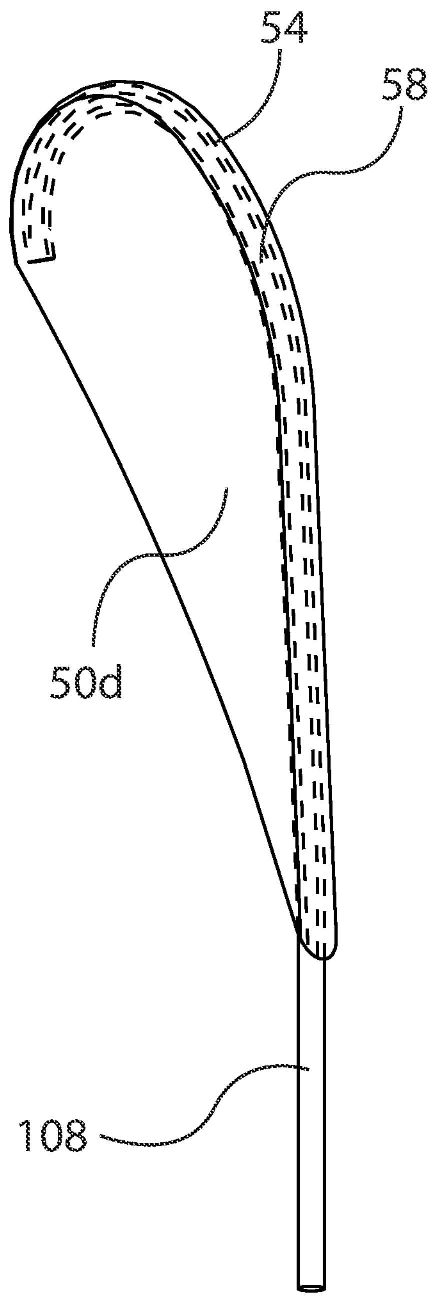
FIG. 36*b* is back perspective view of the illuminated banner in FIG. 36*a;*
Figure 37A:
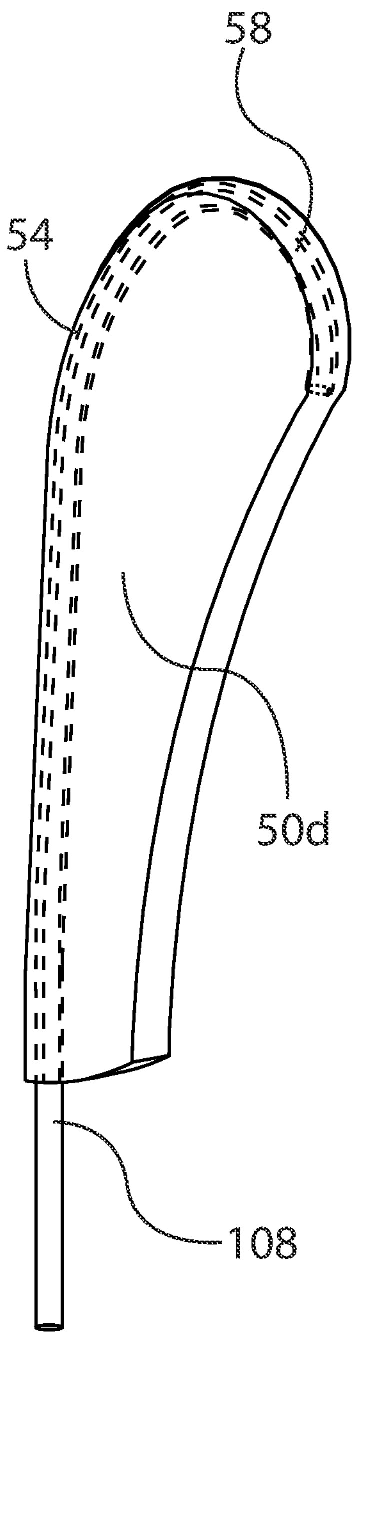
FIG. 37*a* is a front perspective view of one embodiment of an illuminated banner in accordance with the present invention.
Figure 37B:
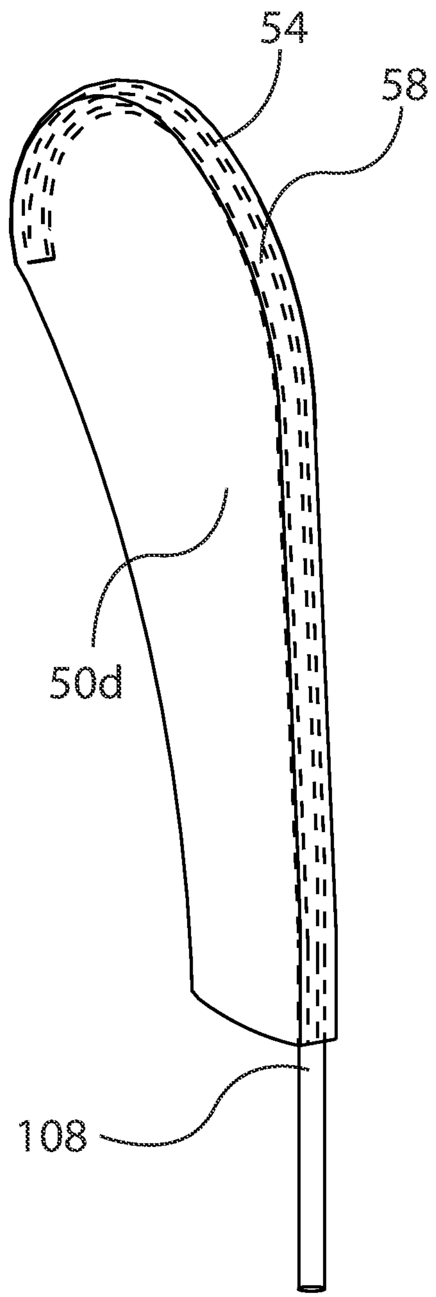
FIG. 37*b* is back perspective view of the illuminated banner in FIG. 37*a;*
Figure 38A:
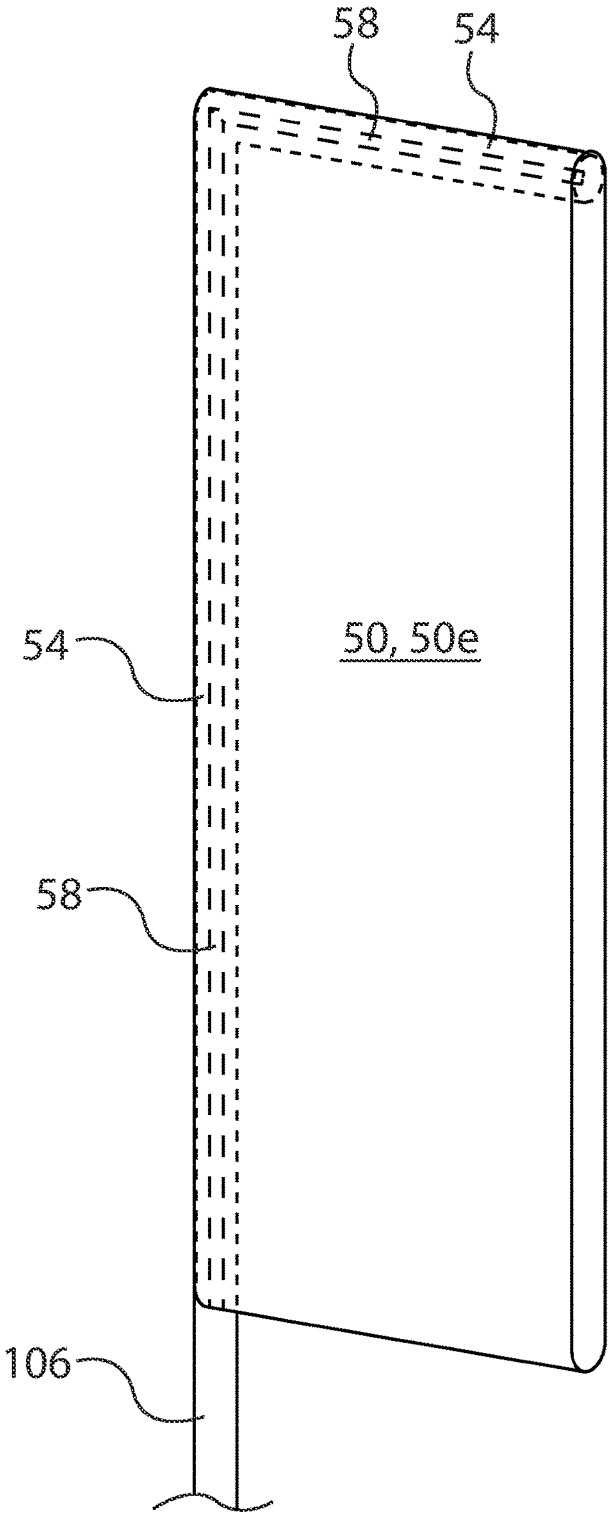
FIG. 38*a* is a front perspective view of an illuminated banner in accordance with the present invention.
Figure 38B:
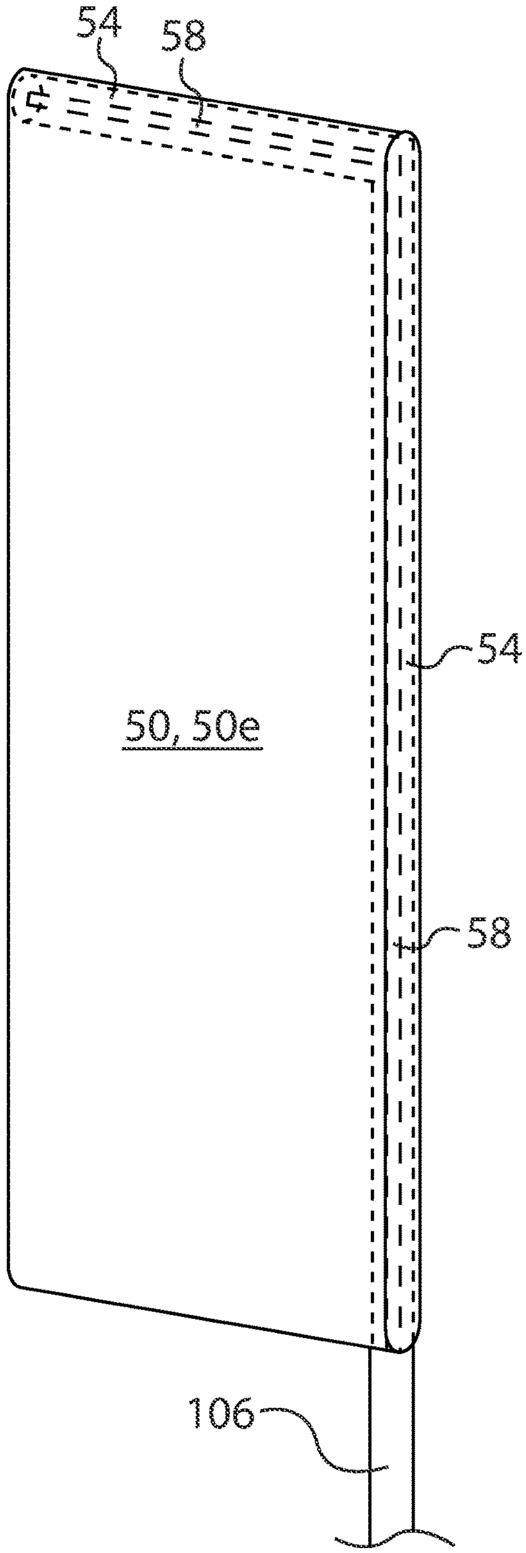
FIG. 38*b* is a back perspective view of the illuminated banner in FIG. 38*a;*
Figure 39A:
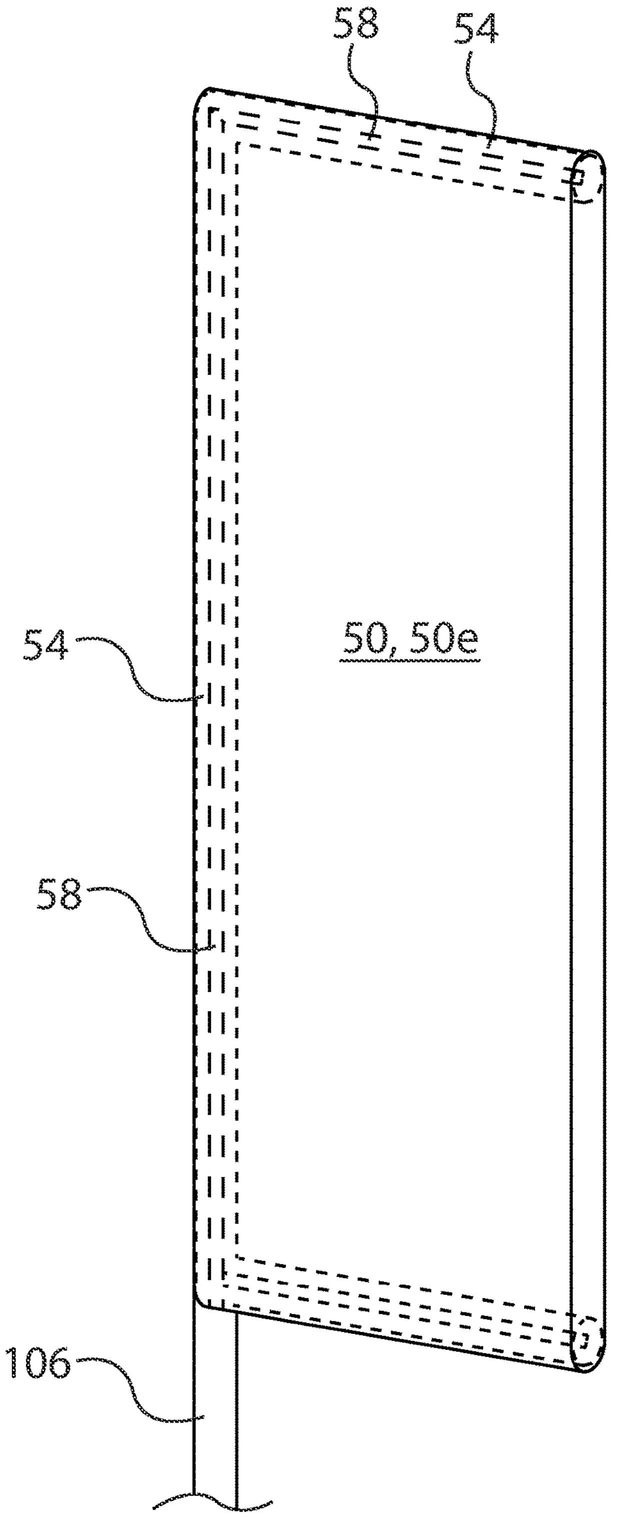
FIG. 39*a* is a front perspective view of an illuminated banner in accordance with the present invention.
Figure 39B:
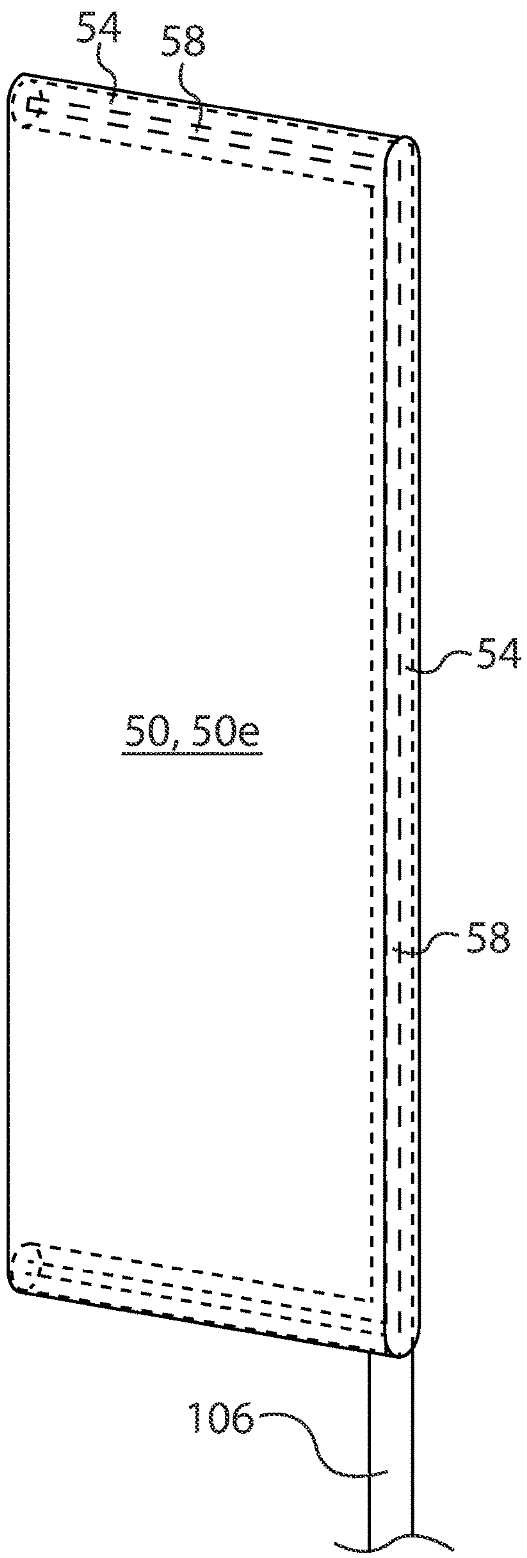
FIG. 39*b* is a back perspective view of the illuminated banner in FIG. 38*a;*
Figure 40A:
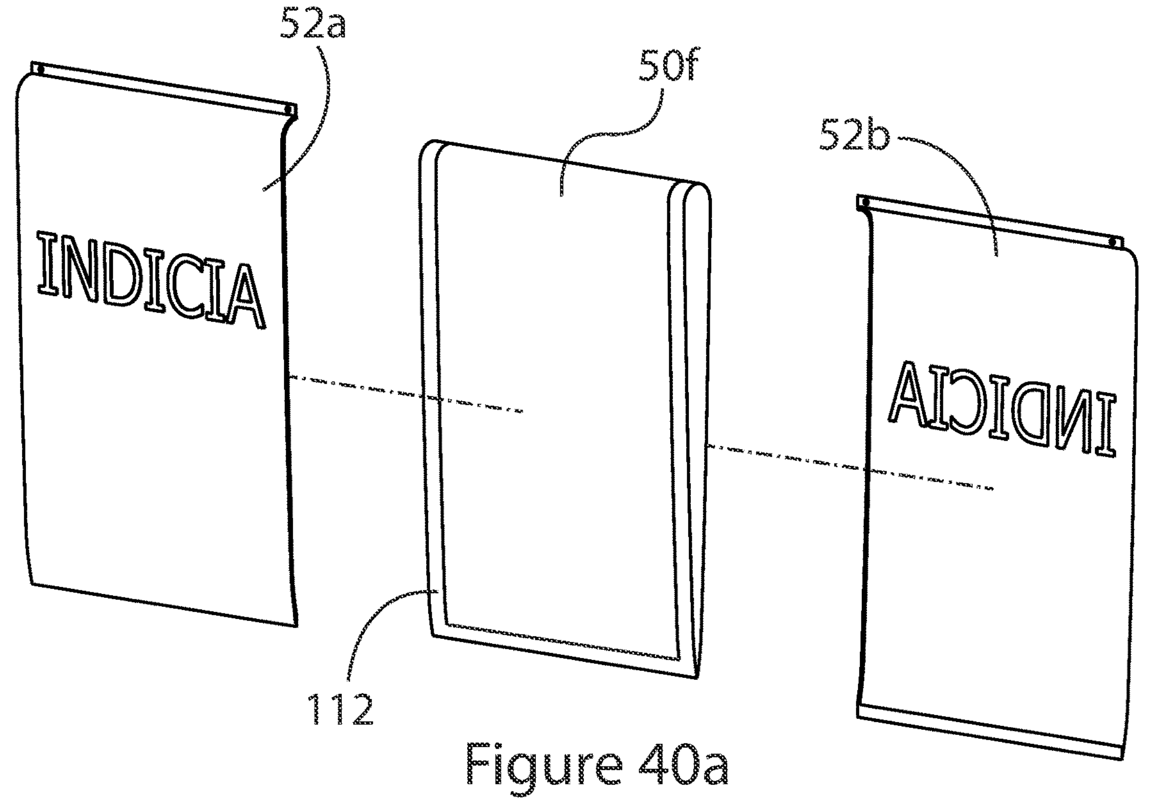
FIG. 40*a* is an exploded view of a kit for creating an illuminated flag with a user's own personal indicia.
Figure 40B:
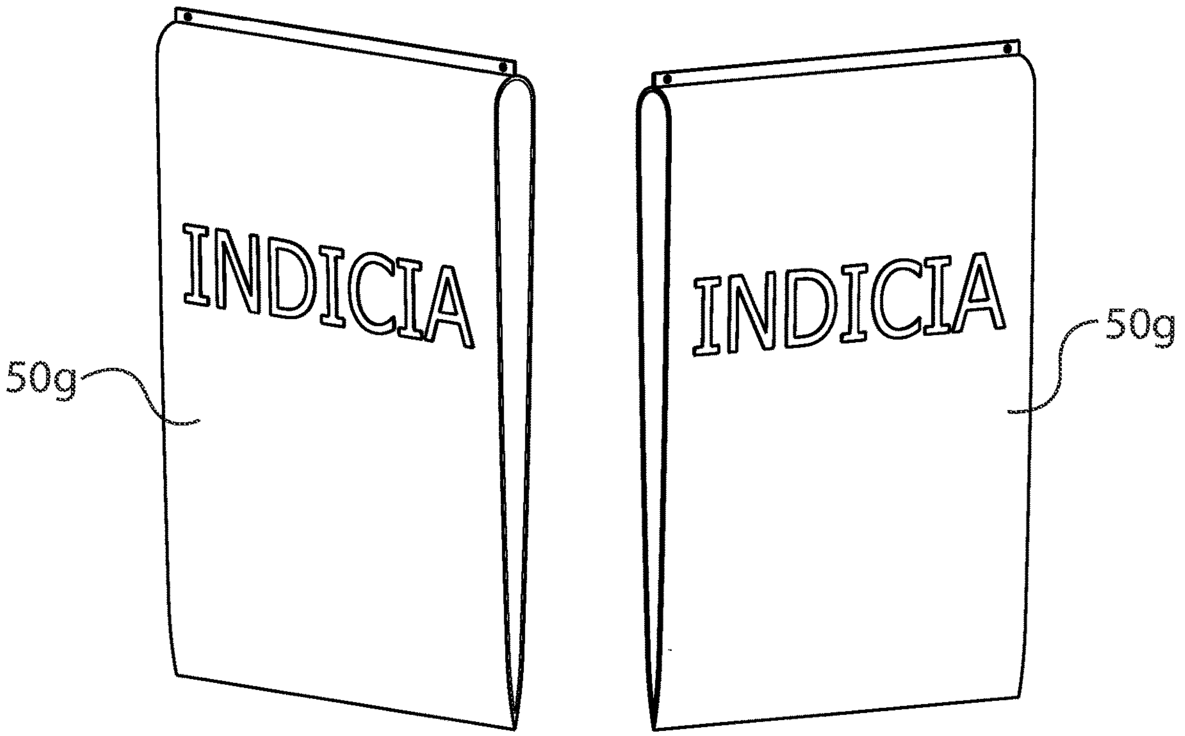
FIG. 40*b* is an assembled view of the kit in FIG. 40*a* showing an assembled illuminated flag.

Still other embodiments, FIGS. 34-39*b*, flag 50 may be supported by other means or connected as a plurality of flags to create banners. In FIG. 34 triangular shaped flags 50*b* are connected together along a cable 110 creating a long banner of lit flags. Each flag 50*b* may have any of the elements of the flag 50 as discussed above. Cable 110 may be an electrical wire that powers the light source located within each flag 50*b*. In FIG. 35 a semi-circular flag 50*c* is provided with all of the elements of the flag 50 as discussed above. In FIGS. 36*a*-37*b*, flag 50*d* is held on a post 108 and shaped over a curved spacer to form a standalone banner. In FIGS. 38*a*-39*a* show elongated flags 50 or banners 50*e* that provided on a support 106 with a light source 58 on any one of the top, bottom or sides.

Various surface designs or surface ornamentations may be integrated with flag 50. These designs may be applied through dyes that have been impregnated into the layers 52 of the flag. These designs may also be sewn or adhered to the surface of layers 52. Examples of surface ornamentation may include national flags such as United States stars and stripes, state flags, family crests, social movement flags, business advertisements, etc.

Flag 50 may also be provided as a kit including all of the elements of the flag as describe in this disclosure, but allowing the user to attach their own flags to the outer surface to accommodate unique flag designs that the user wants to display. For example in FIGS. 40*a*-*b*, flag 50*f* is provided that has two substantially transparent flag layers 52 and substantially translucent side layers 53. Flag layers 52*a* and 52*b* have indicia on them that the user bought as single layer flags or that the user created themselves. Flag 50*g* has a securing mechanism 112 for securing flag layers 52. Securing mechanism may be an adhesive, fasteners, Velcro® snaps, etc. Flag layers 52 with indicia may also be sown to Flag 50*g*.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. An illuminated flag; comprising:

a) a first layer of the flag;

b) a second layer of the flag;

c) an optically transparent tube separating the first and second flag layers to form an optical cavity between the first and second flag layers;

d) a light source within the optically transparent tube to illuminate the first and second layers of the flag from within the optical cavity, wherein the first and second layers are fastened directly to each other to surround the light source and the optically transparent tube, wherein the first and second flag layers create a 3-dimensional flag having an inner and outer flag surface, wherein light is transmitted through the flag to illuminate the entire outer surface of the flag; and e) a patterned density filter that is curved to fit within the interior of the optically transparent tube, wherein the patterned density filter is between the light source and the first and second layers of the flag, wherein the patterned density filter blocks more light from the light source to those parts of the inner flag surface closer to the light source than further from the light source to give more uniform illumination across the first and second flag layers.

2. The illuminated flag as recited in claim 1, wherein the first and second layers of flag are translucent fabric.

3. The illuminated flag as recited in claim 1, wherein the light source illuminates the whole inner surface of the flag with light passing through the transparent tube.

4. The illuminated flag as recited in claim 1, further comprising a flag weight, wherein the flag weight is located distally from the light source and entirely contained within the first and second flag layers to keep the optical cavity at shape.

5. The illuminated flag as recited in claim 1, further comprising side layers connecting the first and second layers of flag to define the optical cavity.

6. The illuminated flag as recited in claim 1, further comprising at least one optically transparent cavity shaping element that keeps the first and second layers of flag separated.

7. The illuminated flag as recited in claim 6, wherein the first and second layers of flag are flexible layers that can be bent by wind; wherein the flexible layers can bend inward between the at least one optically transparent cavity shaping elements and shadow light from areas of the flag further away from the light source to create a shadow texture on the exterior of the flag.

8. The illuminated flag as recited in claim 6, wherein the optically transparent cavity shaping element is an optically transparent strip.

9. The illuminated flag as recited in claim 1, further comprising a flag pole; wherein the flag pole is separated from the flag and attached outside of the flag at only two discrete locations along the flag pole.

10. The illuminated flag as recited in claim 9, wherein the flag pole contains a power source.

11. An illuminated flag; comprising:

a) flag layers creating an inner and an outer flag surface;

b) an optically transparent tube separating the flag layers to form an optical cavity between the flag layers;

c) a light source within the optically transparent tube to illuminate the inner flag surface; wherein the optically transparent tube is completely surrounded by the flag layers; wherein light from the light source passes through the optically transparent tube to illuminate the entire inner surface of the flag; and d) a patterned density filter between the light source and flag layers, wherein the flag layers have walls closest and furthest from the light source; wherein the patterned density filter is curved to lay along a curved surface of the optically transparent tube, wherein the light is blocked more for the closest walls by the patterned density filter thereby dimming them to be more equal in intensity to the furthest walls.

12. The illuminated flag as recited in claim 11, further comprising a plurality of cavity shaping elements, wherein each cavity shaping element is fastened to the inner surface of the flag layers, wherein each cavity shaping element is an optically transparent strip possessing a bias to spread the first and second flag layers apart.

* * * * *